US008885245B2

(12) United States Patent
Moidu et al.

(10) Patent No.: US 8,885,245 B2
(45) Date of Patent: Nov. 11, 2014

(54) BIAXIAL MEMS MIRROR WITH HIDDEN HINGE AND STAGGERED ELECTRODES

(75) Inventors: Abdul Jaleel K. Moidu, Nepean (CA); John Michael Miller, Gatineau (CA)

(73) Assignee: JDS Uniphase Corporation, Milpitas, CA (US)

( * ) Notice: Subject to any disclaimer, the term of this patent is extended or adjusted under 35 U.S.C. 154(b) by 338 days.

(21) Appl. No.: 13/358,562

(22) Filed: Jan. 26, 2012

(65) Prior Publication Data

US 2013/0194654 A1     Aug. 1, 2013

(51) Int. Cl.
*G02B 26/00*     (2006.01)

(52) U.S. Cl.
USPC ........................... 359/291; 359/237; 359/290

(58) Field of Classification Search
USPC ................. 359/290–292, 237, 245, 260–261, 359/262–263, 298, 301–303, 317–318, 359/223–225, 295, 198
See application file for complete search history.

(56) References Cited

U.S. PATENT DOCUMENTS

| | | | |
|---|---|---|---|
| 5,212,582 A | 5/1993 | Nelson | 359/224.1 |
| 5,719,695 A * | 2/1998 | Heimbuch | 359/291 |
| 6,533,947 B2 | 3/2003 | Nasiri et al. | 216/2 |
| 6,535,319 B2 | 3/2003 | Buzzetta et al. | 359/225.1 |
| 6,934,439 B2 | 8/2005 | Mala et al. | 385/18 |
| 6,968,101 B2 | 11/2005 | Miller et al. | 385/18 |
| 7,010,188 B2 | 3/2006 | Miller et al. | 385/18 |
| 7,952,778 B2 | 5/2011 | Moidu et al. | 359/198.1 |
| 2007/0236775 A1 | 10/2007 | Miller et al. | 359/291 |
| 2010/0103494 A1* | 4/2010 | Moidu | 359/225.1 |

OTHER PUBLICATIONS

Jung et al, "High Fill-Factor Two-Axis Gimbaled Tip-Tilt-Piston Micromirror Array Actuated by Self-Aligned Vertical Electrostatic Combdrives", Journal of Microelectromechanical Systems: vol. 15, No. 3, pp. 563 to 571, Jun. 2006.

* cited by examiner

*Primary Examiner* — Dawayne A Pinkney
(74) *Attorney, Agent, or Firm* — Teitelbaum & MacLean; Neil Teitelbaum; Doug MacLean

(57) ABSTRACT

A multi-layer hidden hinge and actuator design for high fill factor biaxial MEMS mirror array for wavelength selective switches (WSS) including a coarsely aligned orthogonal vertical comb drive and/or parallel plate actuator. Each micromirror in the MEMS linear piano micro-mirror array comprises a reflective body/mirror layer, a ground/hinge layer and a hot electrode/substrate layer. To increase the amount of surface area available for the hot and ground electrodes, the dimensions of the ground/hinge layer are extended longitudinally or laterally across the air gap between reflective layers to beneath the adjacent reflective layer. Ideally, diffraction patterns are formed on the surface of the ground/hinge layer to prevent stray light from reflecting back into the system.

20 Claims, 18 Drawing Sheets

BIAXIAL MEMS MIRROR WITH HIDDEN HINGE AND STAGGERED ELECTRODES

TECHNICAL FIELD

The present invention relates to a multi-layer stacked micro-electro-mechanical (MEMS) mirror, and in particular to a MEMS mirror pivotable about two orthogonal axes (roll and tilt) with the hinges and the actuator fabricated in a separate layer underneath the mirror, and with staggered roll electrodes extending beneath adjacent structures to increase torque.

BACKGROUND OF THE INVENTION

Conventional hidden hinge MEMS mirrors, such as those disclosed in U.S. Pat. No. 5,212,582 issued May 18, 1993 in the name of William Nelson, and U.S. Pat. No. 6,535,319 issued Mar. 18, 2003 in the name of Victor Buzzetta et al, include a mirror mounted on the end of a pedestal, extending from a substrate, which are rotatable about a single axis and actuated by electrodes patterned on the substrate below each side of the mirror. In an effort to provide biaxial rotation, Nasiri et al, disclose a MEMS mirror with a complicated hidden lever system, in U.S. Pat. No. 6,533,947 issued Mar. 18, 2003. Unfortunately, the device disclosed in Nasiri et al requires four independent levers and four sets of electrodes equally spaced 90° from each other beneath the mirror, thereby requiring a mirror with a large surface area. Furthermore, an array of such mirrors could not be tightly packed together for reflecting individual wavelengths of light, which has been dispersed in an optical switch. Jung et al disclose a somewhat higher fill factor micro-mirror in an article entitled: "High Fill-Factor Two-Axis Gimbaled Tip-Tilt-Piston Micromirror Array Actuated by Self-Aligned Vertical Electrostatic Combdrives" in the Journal of Microelectromechanical Systems, Vol. 15, No. 3, pages 563 to 571, June 2006; however, the actuation thereof requires eight sets of electrodes spaced apart in a square configuration, thereby increasing the required size of each micro-mirror. Moreover, the comb fingers for the tilt electrode extend perpendicular to the tilt axis, and require relatively fine finger spacing, e.g. 3 um. Piano-MEMS micro-mirrors, which tilt about two perpendicular axes and can be tightly packed together, are disclosed in U.S. Pat. No. 6,934,439 issued Aug. 23, 2005 in the name of the present Applicant. A hidden hinge version of the piano-MEMS micro-mirrors is disclosed in U.S. Patent Publication 2007/0236775 published Oct. 11, 2007 in the name of the present Applicant. The aforementioned piano-MEMS devices pivot about a single centrally located post with the use of torsional hinges and a gimbal ring. Since these devices attract the lower surface of the mirrored platform toward the hot electrodes on the substrate, the precision and maximum tilt angle is limited by the size of the mirror.

Future MEMS mirror arrays for wavelength selective switching call for relatively long and stiff (thick) mirrors capable of tilting in two axes, and a relatively high tilt angle. Hidden hinge designs, in which the mirror is fabricated in a layer above the hinge plane, are attractive to reduce mirror mass moment of inertia and chip size, as the mirror need only be about the same size as the optically active area required.

One solution is disclosed in U.S. Pat. No. 7,952,778 issued May 31, 2011 to Moidu et al illustrated in FIGS. 1 to 4. With reference to FIG. 1 the hidden hinge device includes a substrate wafer 1 formed with a valley section 2 and raised supports 5a and 5b at opposite ends thereof. The substrate wafer 1 is patterned with a rectangular-shaped Y (or tilt) electro-static electrode 3, generally along and symmetrical about the longitudinal X-axis of the device and on one side of the lateral Y-axis of the device, and a C-shaped X (or roll) electro-static electrode 4 extending along one side of the valley section 2, i.e. on one side of the longitudinal X axis and on both sides of the lateral Y axis, symmetrical thereto. The roll electrode 4 includes two large sections, one on opposite sides of the Y-axis, and a thin trace section extending therebetween, providing an area for the tilt electrode 3 to be located between the large sections of the roll electrode 4. Each of the large sections is arranged between the tilt electrode 3 and one of the raised end supports 5a or 5b, and connected through the middle by the elongated trace section, which is thinner than the large sections, and which extends beneath the side of the mirror corresponding to the roll electrode 4. Positioning the roll and tilt electrodes 3 and 4, respectively, along the X axis enables relatively long and thin mirror structures to be positioned relatively close together with only a small air gap therebetween.

With reference to FIG. 2, a ground electrode/hinge wafer 6, processed independent of the substrate wafer 1, is bonded at each end thereof onto the supports 5a and 5b of the substrate wafer 1, suspending the remaining electrode/hinge structure above the valley section 2 of the substrate wafer 1. The electrode/hinge wafer 6 includes an inner, tilting, rectangular ground element or platform 7 pivotable about the lateral Y axis defined by laterally extending torsional tilt (piano) hinge 8. The outer ends of the tilt hinge 8 are fixed to cross braces 9 proximate the lateral Y axis. The tilt electrode 3 is disposed below one side of the tilting ground platform 7, i.e. on one side of the Y-axis for attracting the bottom of one side of the tilting ground platform 7.

The cross braces 9 connect outer rolling structures 11a and 11b, e.g. frames or platforms, forming a rolling ground electrode element 10 with ground electrode surfaces for the hot roll electrode 4, which is disposed below one side of both of the rolling structures 11a and 11b, and below one of the cross braces 9. As a result, the rolling ground electrode element 10 surrounds the tilting ground platform 7. A generally longitudinally extending torsional roll hinge 12 extends from the outer end of each of the rolling structures 11a and 11b to mounting platforms 13, which are mounted on the raised sections 5a and 5b of the substrate 1. The tilting ground element 7 is capable of tilting independently from the rolling ground electrode 10 about the Y-axis, because the tilt hinges 8 extend from the rolling ground electrode 10 and do no resist rotation about the Y-axis. The entire rolling ground electrode 10 along with the tilting ground platform 7 tilt (roll) together about the X-axis via roll hinges 12, because the tilt hinges 8 resist rotation of the tilting element 7 about the X-axis relative to the rolling ground electrode 10. The roll hinges 12 also acts as an electrical connection between ground and external bond pads.

With reference to FIGS. 3 and 4, a mirror wafer 15 is patterned separately from the ground electrode/hinge wafer 6 and the substrate wafer 1 with an upper mirrored platform 16 and pedestal 17 extending downwardly therefrom, which in turn is bonded onto the tilting ground platform 7. The mirror wafer 15 may have stiffening features, such as ribs or bulkheads, extending between the pedestal 17 and the mirror platform 16, if required. Ideally, a plurality of the MEMS mirror platforms 16 are positioned adjacent each other with only a small air gap therebetween for redirecting individual sub-beams from a dispersed beam of light, as disclosed in U.S. Pat. No. 6,934,439 issued Aug. 23, 2005 in the name of Mala et al of JDS Uniphase Inc, which is incorporated herein by reference.

When a potential is applied to the tilt electrode 3 relative to ground, the electrostatic force of attraction between one side of the tilting ground platform 7 and the tilt electrode 3 causes the tilting ground platform 7 and the mirror wafer 15 to tilt, relative to the rolling ground electrode 10, about the Y-axis via tilt hinge 8. Similarly when a potential is applied to roll electrode 4 relative to ground, the electrostatic force of attraction between one side of the rolling ground electrode 10 and the roll electrode 4 causes the entire suspended portion of the ground layer 6, including the rolling ground electrode 10 and the tilting ground platform 7 along with the mirror wafer 15, to tilt about the outer roll hinges 12, i.e. the X axis. The angular position of the tilting ground platform 7 and accordingly the mirror platform 16 can be adjusted according to the amount of voltage applied to the tilt electrode 3 for redirecting a sub-beam of light incident on the mirror platform 16 to any one of a plurality of output ports, as is well known in the art of optical switching. To prevent the sub-beam from momentarily being transmitted to an interim output port physically in between the original output port and the new output port, the roll electrode 4 is activated to rotate the mirror platform 16 out of alignment with any of the output ports until the tilt electrode 3 is activated to tilt the mirror platform 16 to the correct angle corresponding with the desired output port. Then the roll electrode 4 is deactivated bringing the rolling ground electrode 10 back into the rest position with the tilting ground electrode 7 tilted at the correct angle corresponding to the desired output port. Suitable electrode configurations are disclosed in U.S. Pat. No. 6,968,101 issued Nov. 22, 2005, and U.S. Pat. No. 7,010,188 issued Mar. 7, 2006 both in the name of Miller et al to JDS Uniphase Inc, which are incorporated herein by reference.

Unfortunately, the aforementioned device disclosed in U.S. Pat. No. 7,952,778 requires that all of the electrodes are positioned directly beneath the mirror; however, as design requirements call for mirror arrays with tighter pitches the width, i.e. the area, of the roll electrode becomes too small to generate enough electrostatic torque to tilt the mirror as required. For example: a mirror array design with a minimum pitch of 93 um only provides 36 um for the roll electrode, which is 9 um short of the 45 um required to provide the sufficient amount of electrostatic torque.

An object of the present invention is to overcome the shortcomings of the prior art by providing a biaxially pivoting MEMS micro-mirror array device in which the pitch is relatively small, but the tilt electrodes are large enough to sufficiently rotate the mirrors out of alignment with interim ports.

SUMMARY OF THE INVENTION

Accordingly, the present invention relates to an array of micro-electro-mechanical (MEMS) devices mounted on a substrate, each MEMS device comprising:

a substrate including first and second supports extending therefrom;

a tilt ground electrode pivotable about a first axis;

first hinges, defining the first axis, extending from opposite sides of the tilt ground electrode;

a roll ground electrode structure, surrounding the tilt ground electrode and receiving the ends of the first hinges, and pivotable about a second axis perpendicular to the first axis;

second hinges, defining the second axis, extending from opposite ends of the roll ground electrode structure, the outer ends of which are fixed to the first and second supports;

a pedestal extending upwardly from the tilt ground electrode;

a reflective body mounted on the pedestal, spaced apart from the tilt ground electrode by the pedestal, and having opposite ends along the second axis and opposite sides along the first axis;

a first hot electrode mounted on the substrate along the second axis for rotating the tilt ground electrode and the reflective body about the first axis; and a second hot electrode mounted on the substrate on one side of the second axis for rotating the roll ground electrode structure, the tilt ground electrode, and the reflective body about the second axis;

wherein the MEMS devices are aligned with the second axes parallel to each other with an air gap between each reflective body; and wherein each of the roll ground electrode structures extends farther from the second axis than the reflective body to provide sufficient torque to roll the reflective body about the second axis.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
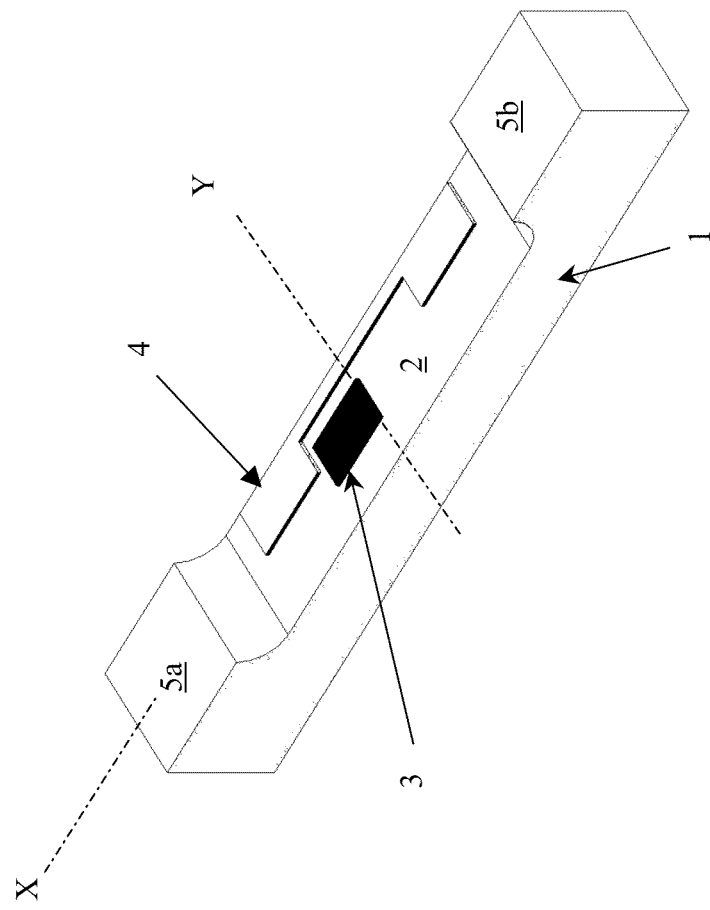
FIG. 1 is an isometric view of an electrode configuration of a previously disclosed MEMS device.
Figure 2:
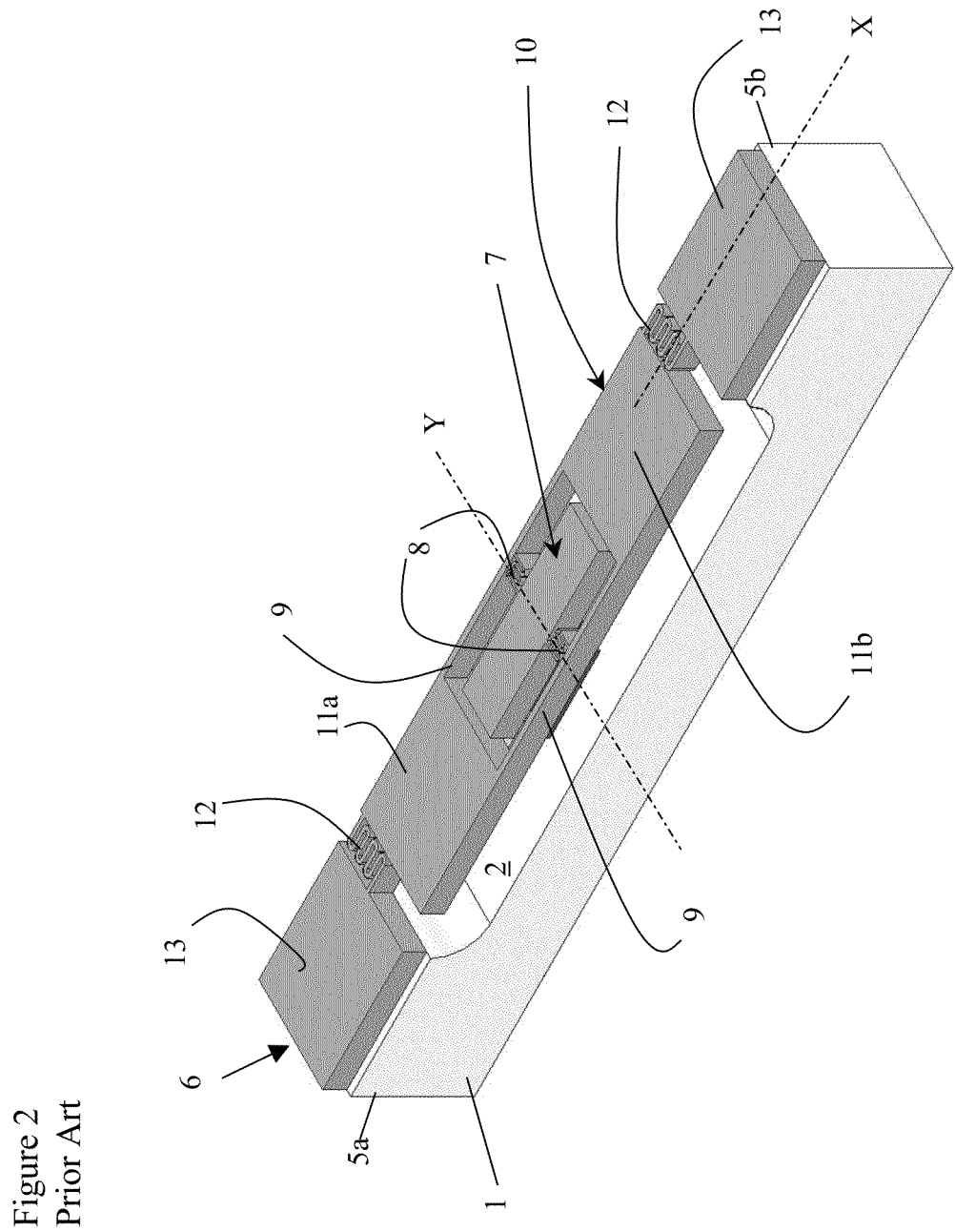
FIG. 2 is an isometric view of a hinge structure of the device of FIG. 1.
Figure 3:
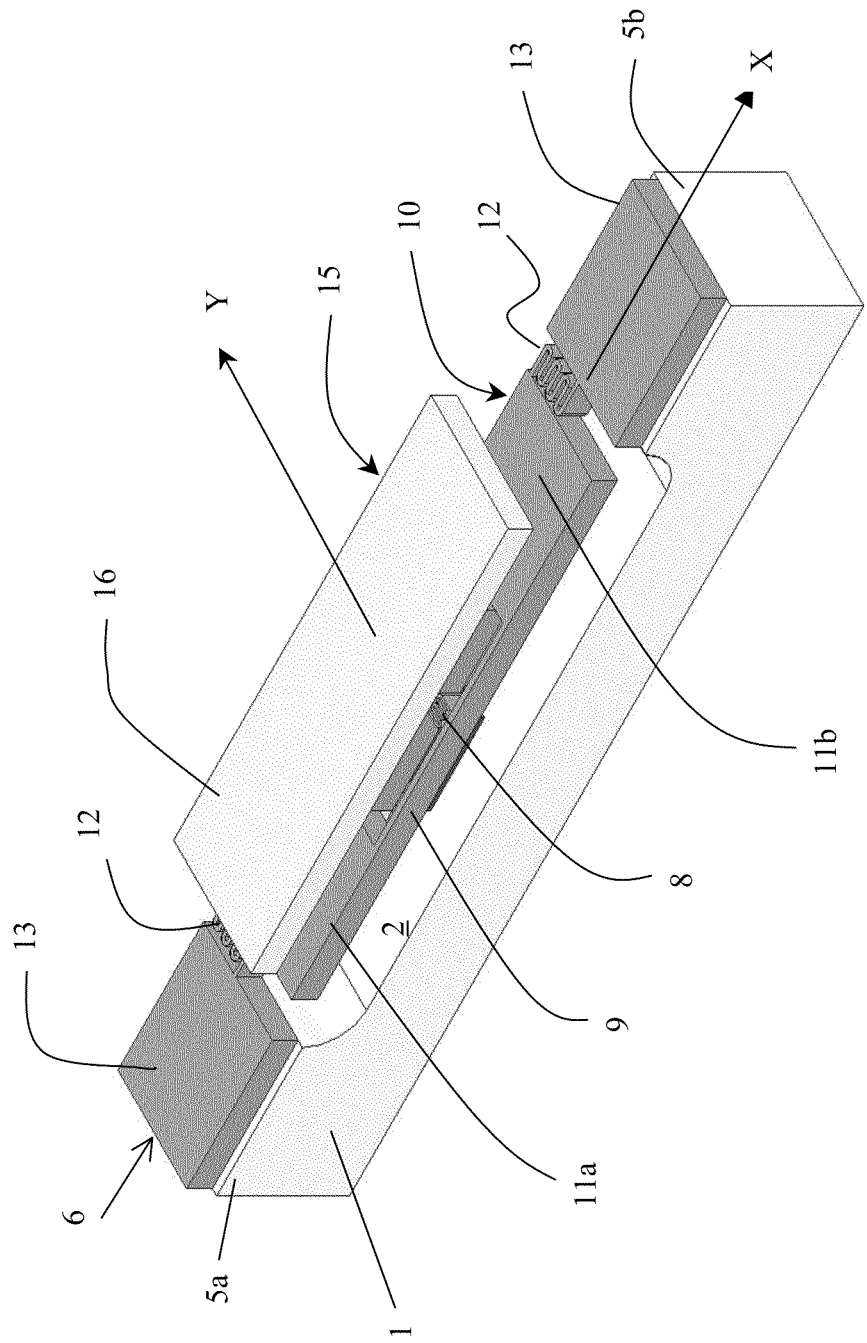
FIG. 3 is an isometric view of the MEMS device according to the first embodiment of the present invention.
Figure 4:
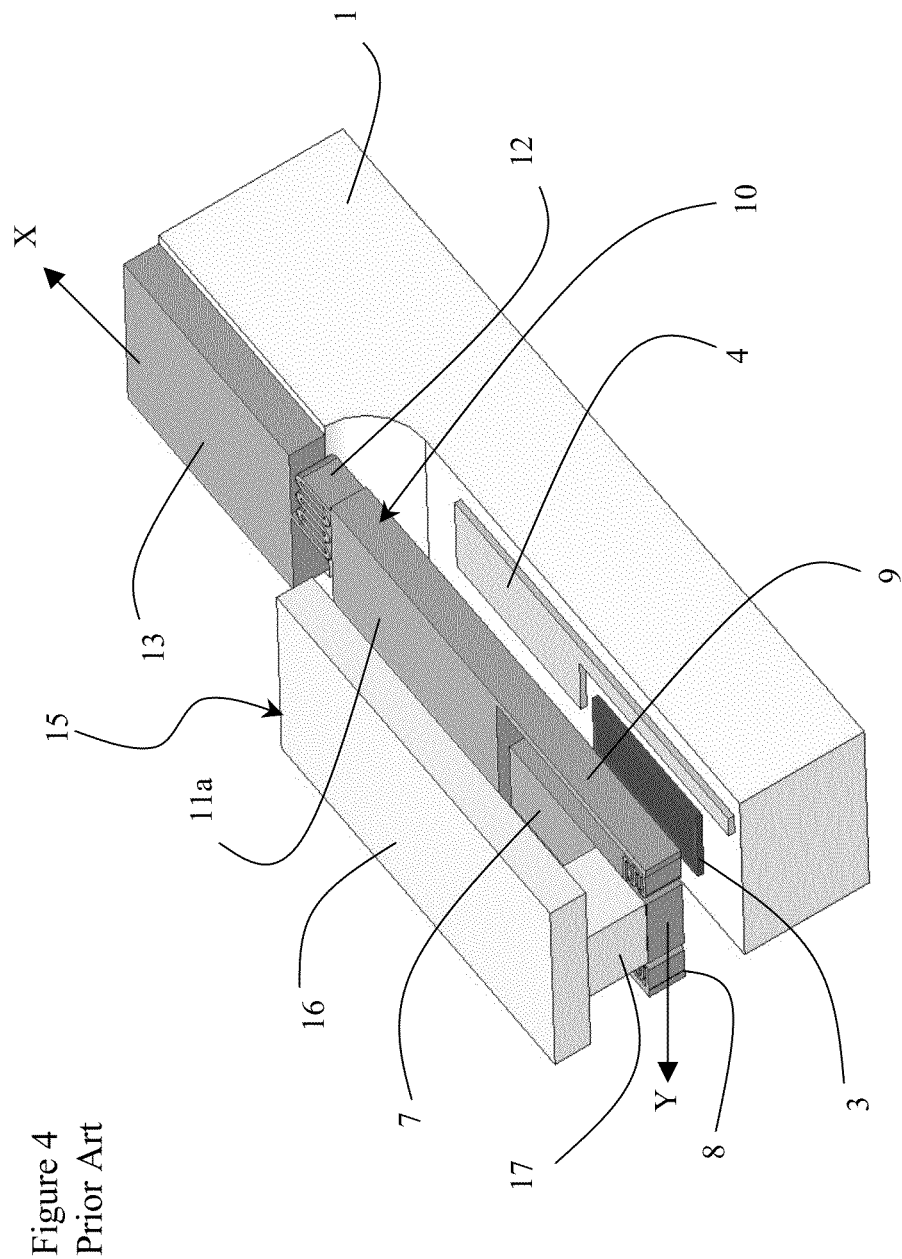
FIG. 4 is a partly cross-sectioned isometric view of the MEMS device of FIG. 1c.

With reference to FIGS. 5 to 8, a first embodiment of the MEMS mirror array device of the present invention includes a substrate wafer 20, e.g. glass or silicon, formed with a valley section 21 and raised supports 22a and 22b at opposite ends thereof. The substrate wafer 20 is patterned with at least one, but preferably two, rectangular-shaped Y (or tilt) hot electrostatic electrodes 23, generally along and symmetrical about the longitudinal X-axis of the device and on opposite sides of the lateral Y-axis of the device. An X (or roll) electro-static hot electrode 24 extends along one side of the tilt hot electrodes 23, i.e. on one side of the longitudinal X axis and symmetrical about the lateral Y axis. Ideally, the hot roll electrode 24 includes two large sections, which are on opposite sides of the Y-axis, and on opposite sides of the hot tilt electrodes 23, with a thinner trace section extending therebetween and beside the hot roll electrodes 24. Ideally, each of the large sections of the hot roll electrode 24 is arranged between one of the hot tilt electrodes 23 and one of the raised end supports 22a or 22b, and connected through the middle by the elongated trace section, which is thinner than the large sections, and which extends beneath the side of the mirror and the ground electrode corresponding to the hot roll electrode 24. A crucial aspect in an elongated mirror array is that leverage for the roll torque is limited, hence a large electrode area is required to achieve the desired electrostatic torque. With the hot roll electrode structure shown, the available space for the hot roll electrode in the elongated mirror array is used efficiently and effectively, and achieves the required roll angle for a given voltage. Moreover, the structure of the hot roll and tilt electrodes 23 and 24 eliminates any undesired tilt induced by the actuation of the hot roll electrode 24. A second hot tilt electrode 23 can be provide on the opposite side of the Y-axis for increasing the control and the range of motion, but use of only a single roll electrode 23 takes up less space, enabling the tilting mirror to remain relatively thin. Positioning the first and second hot tilt electrodes 23 along the X axis enables relatively long and thin mirror structures to be positioned relatively close together with only a small air gap therebetween.

Figure 5:
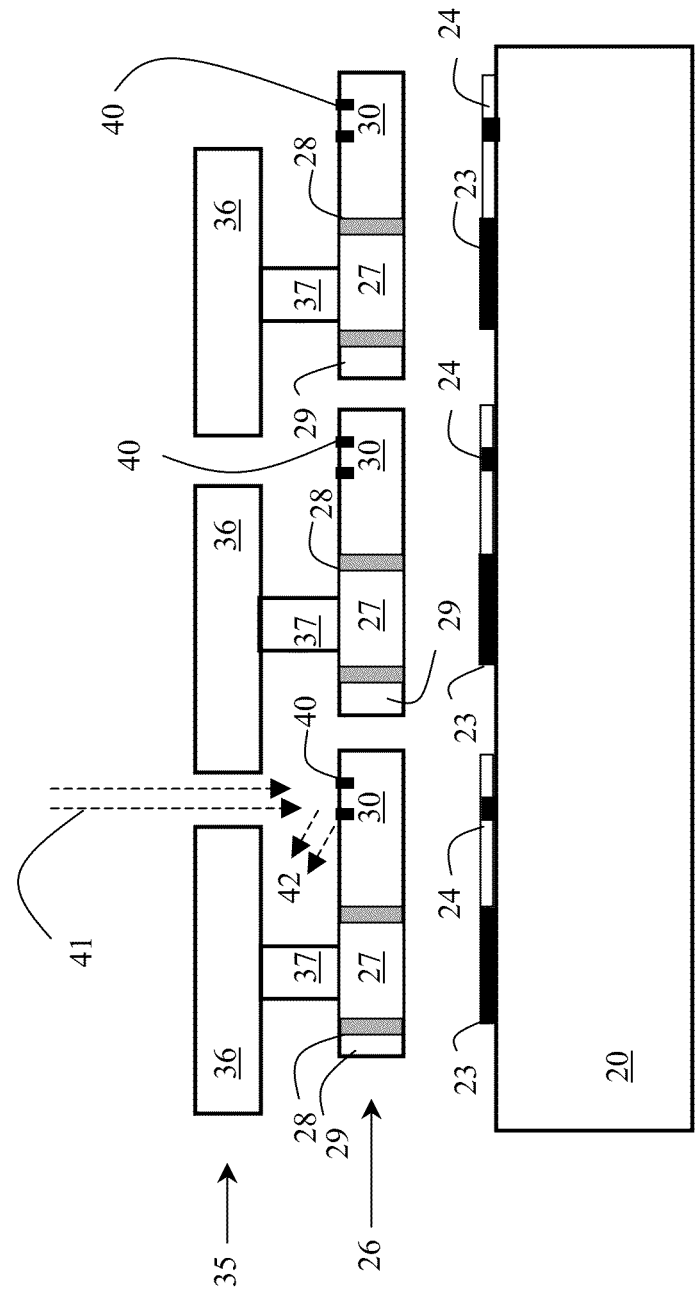
FIG. 5 is a cross-sectional view of an array of MEM's devices in accordance with the present invention.
Figure 7:
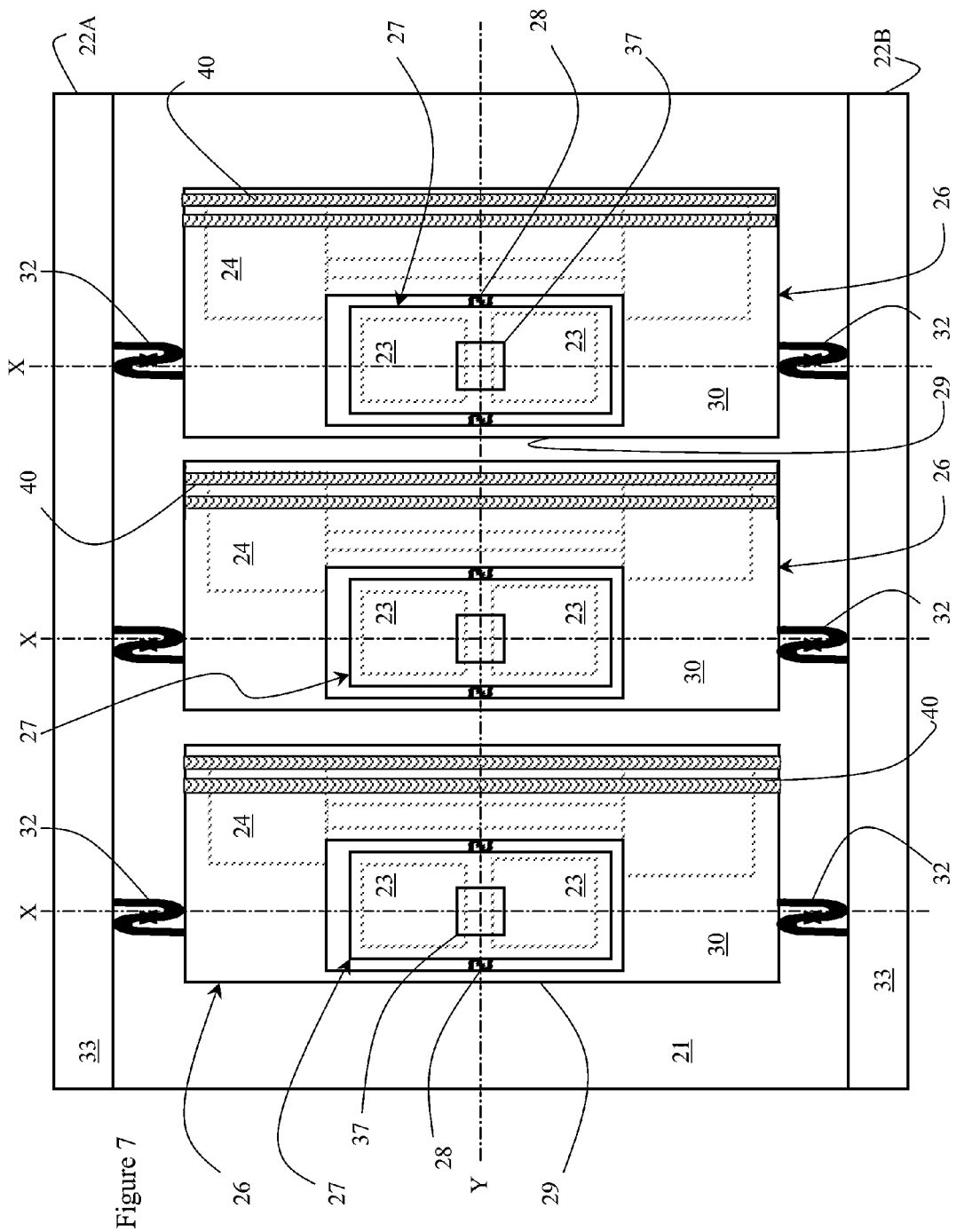
FIG. 7 is a plan view of the pivoting ground electrodes of the device of FIG. 5.
Figure 8:
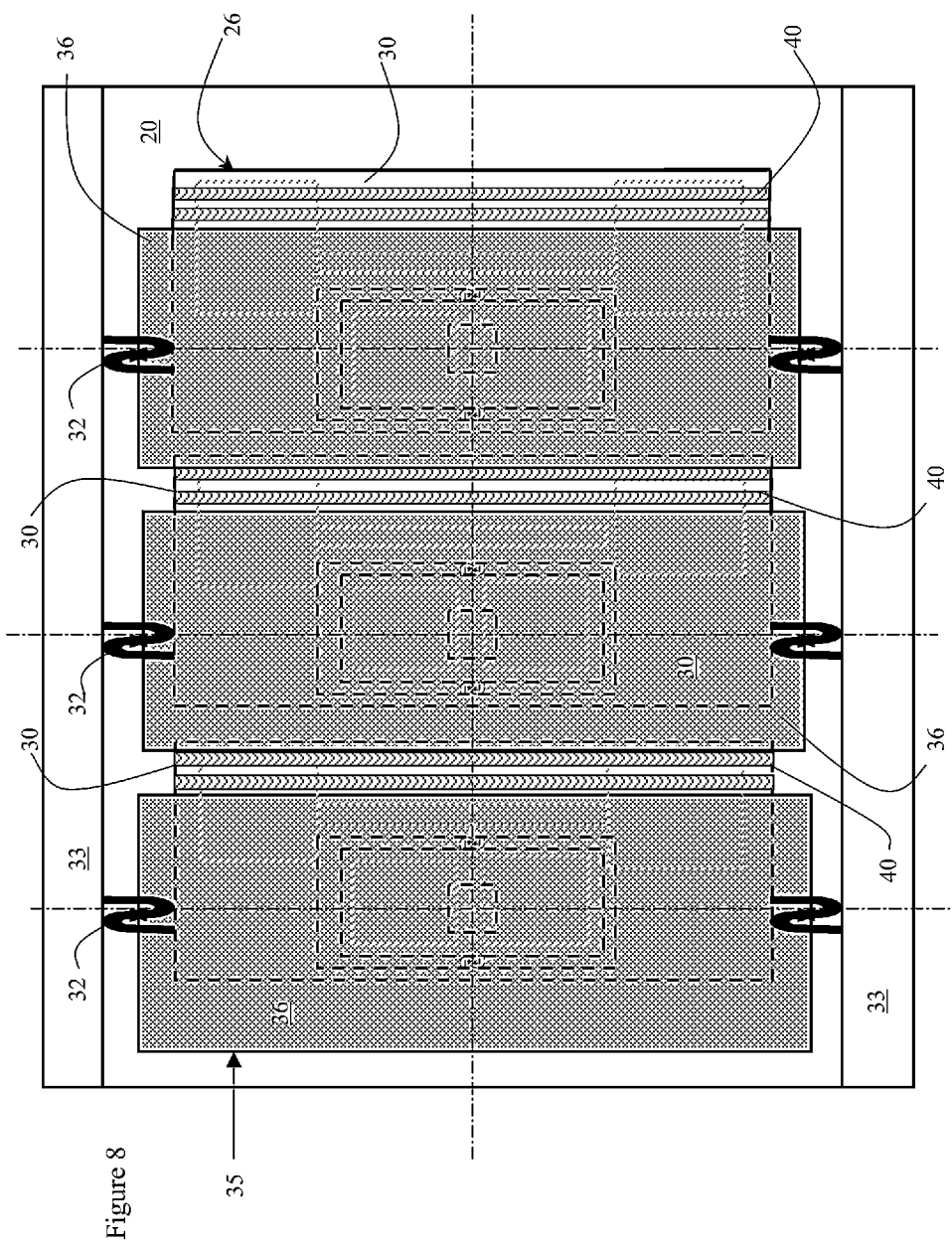
FIG. 8 is a plan view of the device of FIG. 5.

A ground electrode/hinge wafer structure 26, see FIGS. 5 and 7, processed independent of the substrate wafer 20, is hinged at each end thereof onto the supports 22a and 22b of the substrate wafer 20, suspending the remaining electrode/hinge structure above the valley section 21 of the substrate wafer 20. The electrode/hinge wafer structure 26 includes an inner, tilting, rectangular ground element or platform 27 pivotable about the lateral Y axis defined by laterally extending torsional tilt (piano) hinges 28. Each of the hot tilt electrodes 23 is disposed below one side of the tilting ground electrode platform 27, i.e. one on each side of the Y-axis, for attracting the bottom of one side of the tilting ground electrode 27.

The tilt hinge 28 is ideally comprised of first and second serpentine beams extending from opposite sides of the tilting ground electrode 27, each with high aspect ratios, e.g. greater than ten, providing relatively low resistance to rotation about the Y-axis, but relatively higher resistance to rotation about the X-axis, although other hinge configurations, as is known in the prior art, are within the scope of the invention. The outer end of the first serpentine beam is fixed to a cross brace 29 proximate the lateral Y axis, while the outer end of the second serpentine beam is fixed to a C-shaped rolling ground electrode 30 disposed above the C-shaped hot roll electrode 24. The rolling ground electrode 30 extends around to adjacent either end of the tilting ground electrode 27, where it is fixed, i.e. formed contiguously, to either end of the cross brace 29, thereby surrounding the tilting ground electrode 27.

A generally longitudinally extending torsional roll hinge 32 extends from the outer ends of the rolling ground electrode 30 to mounting platforms 33, which are mounted on the raised sections 22a and 22b of the substrate 20. The roll hinge 32 is ideally comprised of serpentine beams, each with high aspect ratios, e.g. greater than ten, providing relatively low resistance to rotation about the X-axis, but relatively higher resistance to rotation about the Y-axis; however, other hinge configurations are within the scope of the invention. The tilting ground electrode 27 is capable of tilting independently from the rolling ground electrode 30 about the Y-axis, because the tilt hinge 28 extends from the rolling ground electrode 30 and does not resist rotation about the Y-axis, enabling the tilting ground electrode 27 to rotate about the Y-axis while the rolling ground electrode 30 remains still. The entire rolling ground electrode 30 along with the tilting ground electrode 27 tilt together about the X-axis via the roll hinge 32, because the tilt hinge 28 resists rotation of the tilting ground electrode 27 about the X-axis relative to the rolling ground electrode 30. The roll hinges 32 also acts as an electrical connection between ground and external bond pads.

A mirror wafer 35 is patterned separately from the ground electrode/hinge wafer 26 and the substrate wafer 20 with an upper reflective body or mirrored platform 36 and a pedestal 37 extending downwardly therefrom, which in turn is bonded onto the tilting ground electrode 27. The pedestal 37 spatially separates the mirrored platform 36 from the tilting ground electrode 27. The mirror wafer 35, see FIGS. 5 and 8, may have stiffening features, such as ribs or bulkheads extending between the pedestal 37 and the mirrored platform 36, if required. While only three MEMS devices are illustrated in the attached figures, ideally in practice, any number of the MEMS devices forming a side-by-side array are positioned adjacent each other with a common tilt axis (Y-axis) parallel roll axes (X-axis), and with only a small air gap between mirrored platforms 36 for redirecting individual sub-beams from a dispersed beam of light, as disclosed in U.S. Pat. No 6,934,439 issued Aug. 23, 2005 in the name of Mala et al of JDS Uniphase Inc, which is incorporated herein by reference.

As the pitch of mirror arrays decreases to less than 100 um the size of the rolling ground and rolling hot electrodes in a conventional mirror array becomes to small to generate enough electrostatic torque to roll each mirrored platform 36 effectively. To increase the amount of electrostatic torque generated between the hot and ground roll electrodes 24 and 30, one or both of the dimensions (length and width) of the rolling ground electrode 30 in accordance with the present invention are extended, so that the rolling ground electrode 30 is longer or wider, i.e. extends more laterally from the X-axis and/or longitudinally from the Y-axis, than the mirror platform 36. Ideally, the rolling ground electrode 30 spans the distance of the air gap between adjacent mirror platforms 36, so that the outer edge of the rolling ground electrode 30 extends to or past the edge of an adjacent mirror platform 36, e.g. is beneath the adjacent mirrored platform 36. In the current embodiment, the rolling ground electrode 30 extends the entire length of the mirror platform 36 for filling the entire air gap between adjacent mirrored platforms 36.

Another problem solved by a preferred embodiment of the present invention is the problem of stray light from an optical system reaching MEMS substrate 20 through the gaps between the MEMS mirrored platforms 36 and being reflected back into the system from the MEMS substrate 20 through the gaps resulting in undesirable back reflection. The back-reflected light degrades optical performance of the optical system.

To solve the problem, according to the present invention, a diffraction pattern 40 is introduced below the air gaps between the mirrored platforms 36 on the upper surface of the rolling ground electrode 30. A diffractive pattern 40 on the upper surface of the rolling ground electrode 30 causes the stray light 41 (FIG. 5) to diffract as beams 42 at such angles that the beams 42 do not return through the gaps between mirrored platforms 36. The diffraction pattern 40 encompasses an area formed by a normal projection, that is a straight-angle projection, of the gap between the mirror platforms 36 onto the upper surface of the rolling ground electrode 30. Any light leaking between the mirrored platforms 36 will be diffracted by the diffractive pattern 40, and therefore, not reflected back into the optical system. In practice, covering about 80% or more of the area on the rolling ground electrode 30 beneath the gap is sufficient to effectively suppress the backreflection.

The diffractive pattern 40 on the upper surface of the rolling ground electrode 30 is shown in FIG. 7 as etched into the top surface, forming a surface-relief diffraction grating defined herein as a diffractive pattern having straight lines. Other types of diffractive patterns, and not necessarily surface-relief patterns but, for example, patterned oxide overlayers on a top surface of the rolling ground electrode 30, with straight or curved lines, diamond patterns, or honeycomb patterns, will also work with present invention.

Throughout the specification, a term "surface" does not necessarily mean a "flat surface". A MEMS wafer may have, and often does have, a complex topography comprising electrodes, leads, micromirror supporting hinges, and the like.

Figure 9:
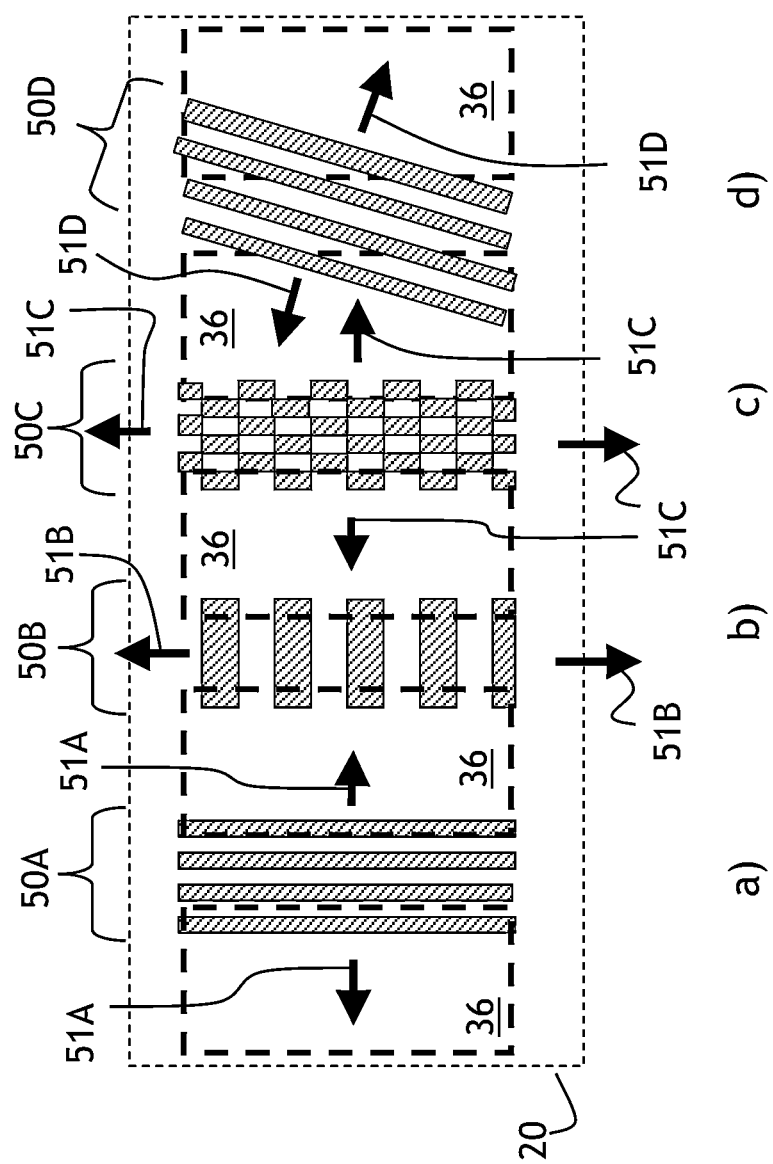
FIG. 9 is a plan view of a variety of different forms of diffraction patterns in accordance with the present invention.

With reference to FIG. 9, preferable diffractive patterns for the upper surface of the rolling ground electrode 30 are illustrated by means of a plan view of a MEMS micromirror array having a MEMS substrate 20, mirrored platforms 36 shown as dashed transparent rectangles, and diffractive patterns 50A to 50D on the rolling ground electrode 30, shown as shaded rectangle patterns. The patterns fall into four types:

a) having lines running parallel to gaps between the mirrored platforms 36, such as the diffractive pattern 50A;

b) having lines running perpendicular to the gaps between the mirrored platforms 36, such as the diffractive pattern 50B;

c) having lines running both parallel to the gaps and lines running perpendicular to the gaps, so as to form a checkerboard pattern such as the diffractive pattern 50C; and d) having straight lines at a slight angle with respect to the gap between the mirrored platforms 36, for example 10 degrees, such as the diffractive pattern 50D.

The diffractive patterns 50A to 50D diffract light falling thereon in directions shown by arrows 51A to 51D, respectively. One advantage of the pattern 50D is that it is more tolerant with regards to slight misalignment between the mirrored platforms 36 and the diffraction pattern 50D than, for example, the diffraction pattern 50A.

For surface-relief diffraction patterns 50A to 50D, "lines" are grooves in the rolling ground electrode 30, the grooved area being shown as shaded rectangles. The grooves have a rectangular cross section and a depth of $m\lambda_0/4$, wherein m is an integer odd number, and $\lambda_0$ is a central wavelength of light impinging onto rolling ground electrode 30. The grooves are etched in the rolling ground electrode 30 to the required depth. Other shapes of a groove cross section, e.g. triangular or trapezoidal cross-section, will also work with the present invention. Furthermore, other diffractive patterns, such as diamond shapes or hexagonal patterns or random patterns, can also be used for as long as the duty cycle is close to 50%, for maximum reduction of substrate reflections. The pattern 50A can contain only a few, two, or even one groove running parallel to a narrow inter-mirror gap.

The back reflection is suppressed due to destructive interference between reflected light from the etched and un-etched regions of the diffractive patterns 50A to 50D. When the etching depth is $m\lambda_0/4$, wherein m is an integer odd number, the difference in phase between light reflected from the etched and un-etched regions is $\lambda_0/2$, or 180° in phase units. When the areas occupied by the etched and un-etched regions are equal, that is, when the duty cycle is 50%, the electric fields from the two regions cancel each other, resulting in zero net reflection from the rolling ground electrode 30 for even diffraction orders, reflection straight back from the rolling ground electrode 30 corresponding to the zero order of diffraction. Of course, the reflected light must go somewhere, and therefore it diffracts at an angle as illustrated in FIG. 5, according to the diffraction theory: $m\lambda_0 = \Lambda (\sin(\theta_{out}) - \sin(\theta_{in}))$, where m is the diffraction order (an odd integer), $\lambda_0$ is the central wavelength, $\Lambda$ is the period of the diffraction pattern, $\theta_{in}$ is the incident angle, and $\theta_{out}$ is the diffracted angle. The period $\Lambda$ of the diffraction patterns 40 can be chosen such that the diffracted light does not interfere with the optical system, for example in FIG. 5 the period A is such that the diffracted light does not return through the mirror gap into the optical system.

A patterned etching to a uniform depth is a well-defined process in MEMS fabrication. Therefore, adding a step of etching binary diffractive patterns on a MEMS wafer does not considerably complicate the overall process of MEMS fabrication. Other diffraction grating structures and processes are disclosed in U.S. Pat. No. 7,903,318, issued Mar. 8, 2011 to Moidu et al, which is incorporated herein by reference When a potential is applied to one of the hot tilt electrodes 23 relative to ground, the electrostatic force of attraction between one side of the tilting ground electrode 27 and the hot tilt electrode 23 causes the tilting ground electrode 27 and the mirrored platform 36 to tilt, relative to the rolling ground electrode 30, about the Y-axis via tilt hinge 28. Similarly when a potential is applied to the hot roll electrode 24 relative to ground, the electrostatic force of attraction between one side of the rolling ground electrode 30 and the rolling hot electrode 24 causes the entire suspended portion of the ground layer 26, including the rolling ground electrode 30 and the tilting ground electrode 27 along with the mirrored platform 36, to tilt (roll) about the outer roll hinges 32, i.e. the X axis. The angular position of the tilting ground electrode 27 and accordingly the mirrored platform 36 can be adjusted according to the amount of voltage applied to the hot tilt electrode 23 for redirecting a sub-beam of light incident on the mirrored platform 36 to any one of a plurality of output ports, as is well known in the art of optical switching. To prevent the sub-beam from momentarily being transmitted to an output port physically in between the original output port and the new output port, the hot roll electrode 24 is activated to rotate the mirrored platform 36 out of alignment with any of the output ports until the hot tilt electrode 23 is activated to tilt the mirrored platform 36 to the correct angle corresponding with the desired output port. Then the hot roll electrode 24 is deactivated bringing the rolling ground electrode 30 back into the rest position with the tilting ground electrode 27 tilted at the correct angle corresponding to the desired output port. Suitable electrode configurations are disclosed in U.S. Pat. No. 6,968,101 issued Nov. 22, 2005, and U.S. Pat. No. 7,010,188 issued Mar. 7, 2006 both in the name of Miller et al to JDS Uniphase Inc, which are incorporated herein by reference.

Figure 10:
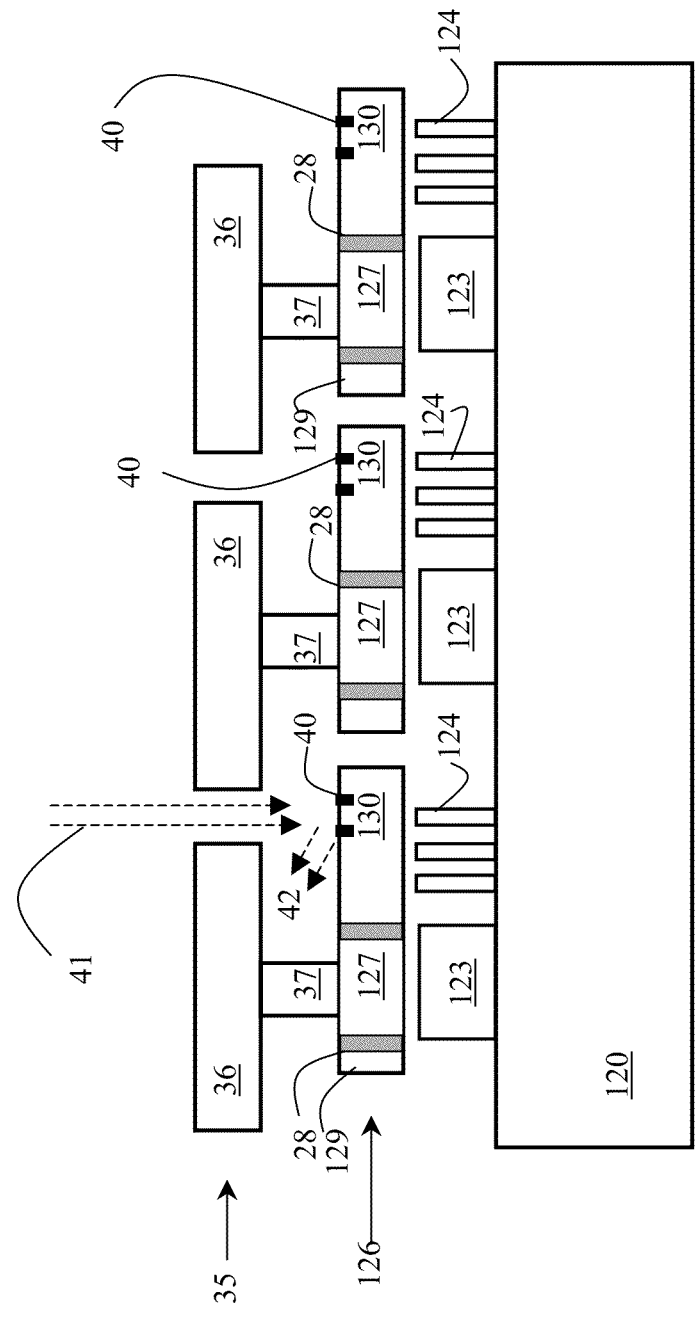
FIG. 10 is a cross-sectional view of a second embodiment of the present invention with an alternative electrode structure.
Figure 11:
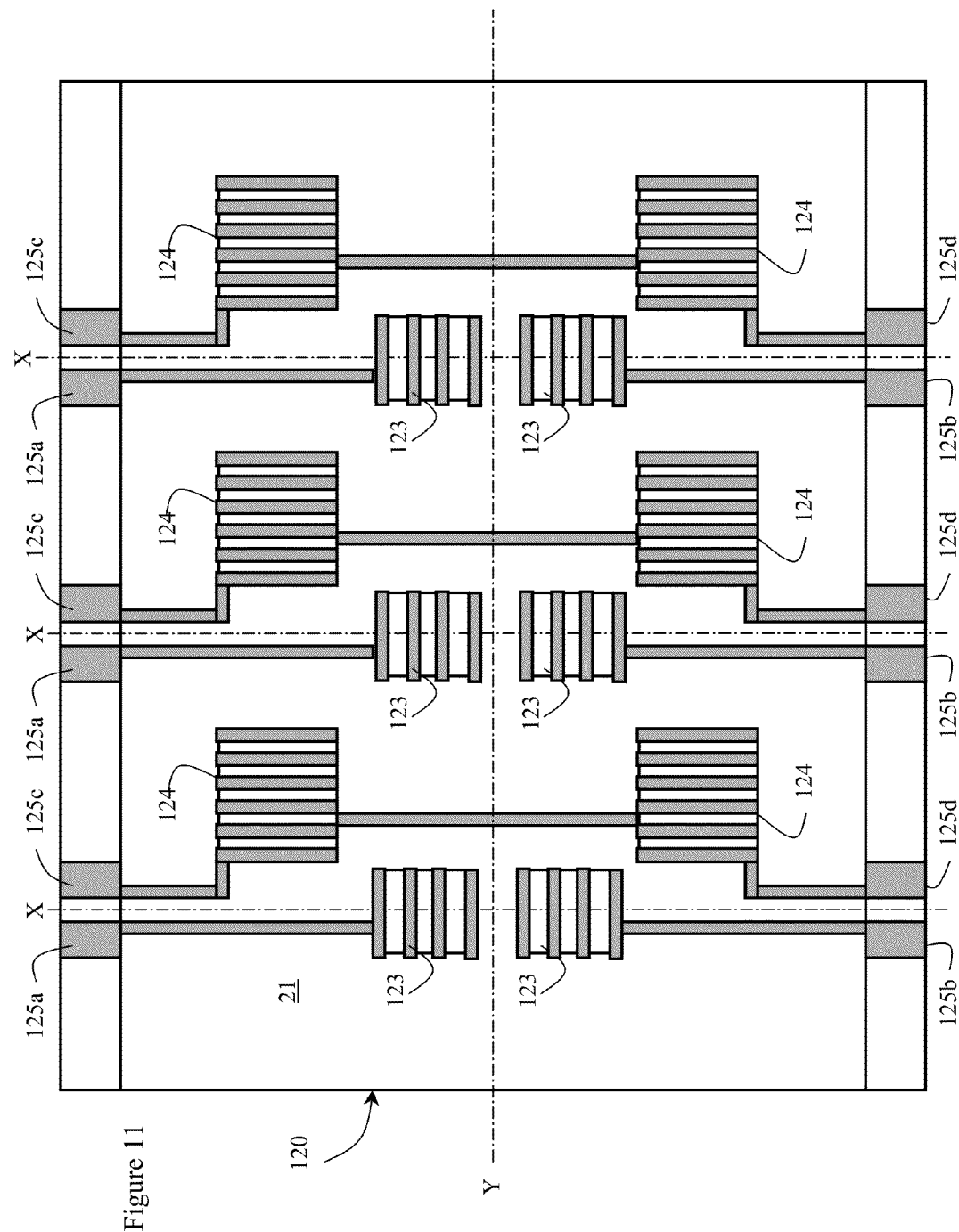
FIG. 11 is a plan view of the alternative hot electrode structure of the device of FIG. 10.

With reference to FIGS. 10 and 11, which illustrate a second embodiment of the present invention, the multi-layer design, according to the present invention, is alternatively implemented with vertical comb drives, instead of electrostatic electrodes. The vertical comb drives provide relatively large electrostatic torque without suffering from pull-in instability phenomenon, enabling relatively high controllable angular range. Vertical comb drives are comprised of interdigitized sets of rotor (moving) and stator (stationary) vertically extending fingers or teeth that are offset from each other in the vertical plane. Torque is generated due to vertical electrostatic force between rotor and stator combs when a potential difference is impressed upon them.

Conventionally the rotor (ground) and stator (hot) combs are tightly spaced, e.g. 4 um apart, therefore a relatively small lateral misalignment, e.g. >1 um, could result in an electrostatic force perpendicular to the fingers which may lead to lateral instability and collapse of the fingers. Accordingly, a precise lateral alignment, e.g. <1 um, is normally required for the fingers, which is challenging from a fabrication view point.

Moreover, in the case of high fill factor mirror arrays, there is an added consideration of in-plane mirror rotation about the tilt hinge and possible interaction with adjacent mirrors, as lateral spacing between mirrors is typically small, e.g. between 10 um and 5 um or less. There is also a wavelength shift associated with such lateral mirror rotation, which is a key consideration for tilt electrodes as the in-plane rotational stiffness of the tilt hinges is lower than that of the roll hinges. For small finger spacing, e.g. 4 um, this consideration calls for even tighter finger alignment, e.g. <0.25 um, therefore a rather complex self-aligned mask fabrication process would be required.

One possible solution to alleviate lateral interaction of fingers, and at the same time avoid complex self-align mask processes, is to increase the finger spacing, e.g. >10 um, so that a relatively coarse misalignment, e.g. of 2 um or less, is acceptable. However, it is highly desirable to eliminate any lateral rotation, as well as enable somewhat larger finger spacing, e.g. 6 um to 10 um, so that available torque is not compromised greatly.

An orthogonal comb actuator enables relatively coarse alignment of the fingers, and at the same time mostly eliminates lateral mirror rotation. In a vertical comb actuator in accordance with the present invention, comb fingers for tilting the mirror about the tilt axis are fabricated in a plane that is perpendicular to the tilt plane of the mirror, i.e. perpendicular to the tilt axis, therefore the lateral forces don't result in any significant rotation. The orthogonal comb actuator does cause in-plane linear movements; however, these are usually manageable as hinges are relatively strong for these modes of movements.

FIGS. 10 and 11 illustrate an implementation of a multi-layer hidden hinge device in accordance with the present invention along with an orthogonal vertical comb actuator. The first layer in a multi-layer structure, e.g. a SOI structure, comprises tilt (Y) and roll (X) hot tilt and roll comb electrodes 123 and 124, respectively, which extend vertically upwardly from the substrate 120. One or two hot tilt comb electrodes 123 can be provided depending on the desired control and range of motion. The first layer is patterned so as to individually address the tilt and roll hot comb electrodes 123 and 124, respectively. One of the hot tilt comb electrodes 123 is connected to a first electrode contact 125a, while the other hot tilt comb electrode 123 is connected separately to a second electrode contact 125b. The hot roll comb electrodes 124 are connected to third and fourth electrode contacts 125c or 125d (note that the two segments of the roll electrodes 124 are connected internally), respectively, and each other. The first and third electrode contacts 125a and 125c form a first raised support at one end of the substrate 120, while the second and fourth electrode contacts 125b and 125d form a second raised support at the opposite end of the substrate 120, with a valley section 121 therebetween.

Preferably, the hot tilt comb electrodes 123 are disposed along the X axis, which corresponds to the longitudinal axis of the mirrored platform 36, with each comb finger symmetrical to the X axis, i.e. the X-Z plane, and parallel to the Y (tilt) axis, i.e. the Y-Z plane or the lateral axis of the mirrored platform 36. The hot roll comb electrodes 124 are also disposed adjacent the X axis, with a first hot roll comb electrode 124 generally between a first hot tilt comb electrode 123 and the first and third electrode contacts 125a and 125c, and a second hot roll comb electrodes 124 generally between a second tilt hot comb electrode 123 and the second and fourth electrode contacts 125b and 125d. Each comb finger of the hot roll comb electrodes 124 is parallel to the X (roll) axis, i.e. the longitudinal axis of the mirrored platform 36, and perpendicular to the Y (tilt) axis, the lateral axis of the mirrored platform 36. For the hot roll comb electrodes 124, an alternative is to use coarsely aligned standard orientation of combs (i.e. comb fingers are parallel to the plane of rotation) or a combination of standards combs and orthogonal combs. This is because the in-plane rotational stiffness of the roll hinges 32 is relatively high.

Figure 12:
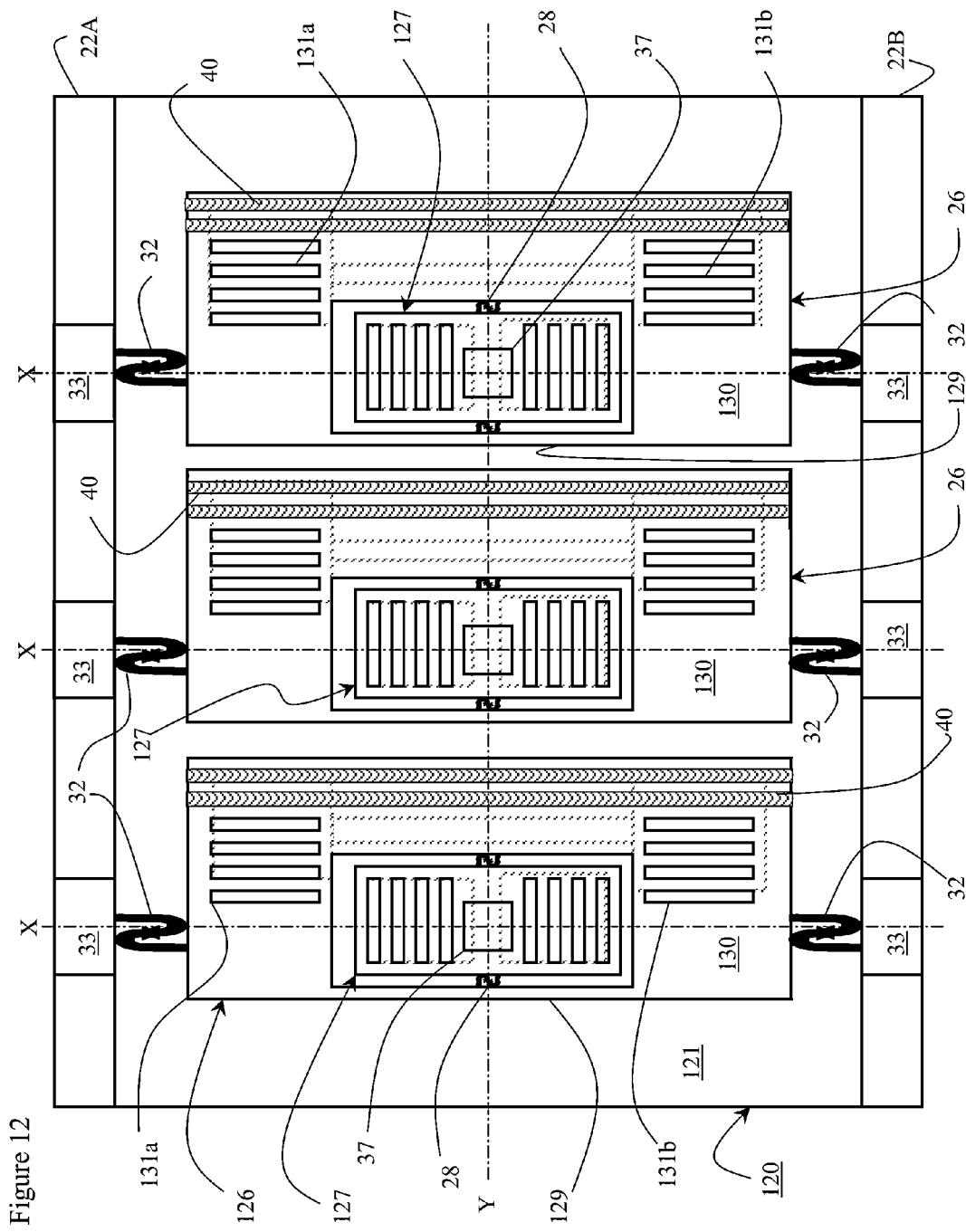
FIG. 12 is a plan view of the alternative ground electrode structure of the device of FIG. 10.

With reference to FIG. 12, a ground electrode/hinge wafer structure 126, processed separately from the hot vertical comb drive substrate layer 120, is bonded at each end thereof onto the first and second raised supports 125a to 125d of the substrate wafer 120 suspending the remainder of the ground electrode/hinge wafer 126 above the hot tilt and roll stator comb electrodes 123 and 124. The electrode/hinge wafer 126 includes an inner, tilting ground comb electrode 127. As with the first embodiment of FIG. 7, the tilting ground comb electrode 127 is pivotable about the lateral Y axis defined by the laterally extending torsional ("piano") tilt hinges 28, the outer end of one of which is fixed to a longitudinal brace 129. The tilt hinges 28 are ideally comprised of two serpentine beams, each with high aspect ratio, e.g. greater than ten, providing relatively low resistance to rotation about the Y-axis, but relatively higher resistance to rotation about the X-axis. The hot tilt comb electrodes 123 are disposed below the tilting ground comb electrodes 127, respectively, i.e. on opposite sides of the tilt hinges 28 and the Y-axis. The tilting ground comb electrode 127 includes two sets of laterally extending cross beams defining rotor comb fingers with slots therebetween offset and interdigitated with the stator comb fingers of the hot tilt comb electrodes 123.

The longitudinally extending brace 129 connects each end of a rolling ground comb electrode 130, which includes two sets of comb fingers 131a and 131b disposed above each of the hot roll comb electrodes 124. Each set of comb fingers 131a and 131b includes longitudinally extending beams defining ground comb fingers, with open slots extending through the rolling ground electrode 130 therebetween, and offset from and interdigitated with the hot comb fingers of the hot roll comb electrodes 124. The longitudinally extending torsional roll hinge 32 extends from each end of the rolling hot comb ground electrode 130 to mounting platforms 33, which are mounted on the raised supports of the roll and tilt stator comb electrodes 125a, 125b and 125c, 125d. The roll hinges 32 are ideally comprised of serpentine beams, each with high aspect ratios, e.g. greater than 10, providing relatively low resistance to rotation about the X-axis, but relatively higher resistance to rotation about the Y-axis. The tilting ground comb electrode 127 is capable of tilting independently of the rolling ground comb electrode 130 about the Y-axis; however, the entire rolling ground comb electrode 130 along with the tilting ground comb electrode 127 tilt (roll) together about the X-axis via roll hinges 32. The roll hinges 32 also act as electrical connection between ground and external bond pads.

As above, to increase the amount of electrostatic torque the width of the rolling ground electrode 130 in accordance with the present invention is extended, so that the rolling ground electrode 130 spans the air gap between adjacent mirrored platforms 36, and so that the outer edge of the rolling ground electrode 130 is beneath the adjacent mirrored platform 36.

As in the aforementioned embodiment, a diffraction pattern 40 is introduced below the air gaps between the mirrored platforms 36 on the upper surface of the rolling ground electrode 130. A diffractive pattern 40 on the upper surface of the rolling ground electrode 130 causes the stray light 41 (FIG. 10) to diffract as light beams 42 at such angles that the light beams 42 do not return through the gaps between mirrored platforms 36. The diffraction pattern 40 encompasses an area formed by a normal projection, that is a straight-angle projection, of the gap between the mirrored platforms 36 onto the upper surface of the rolling ground electrode 130. Any light leaking between the mirrored platforms 36 will be diffracted by the diffractive pattern 40, and therefore, not reflected back into the optical system. In practice, covering about 80% or more of the area of the gap is sufficient to effectively suppress the backreflection. As hereinbefore discussed, the diffraction pattern 40 can take various forms including those discussed with reference to FIG. 9.

As above, the mirrored platform 36 is patterned separately with a pedestal 37, which is bonded onto the tilting ground comb electrode 127. The mirror wafer 35 may have stiffening features, such as ribs or bulkheads incorporated underneath. The upper surface of the mirrored platform 36 is typically coated with a highly reflective material.

When a potential is applied to one of the hot tilt comb electrodes 123 relative to ground layer 126, the electrostatic force of attraction between the hot tilt comb electrode 123 and the corresponding tilting ground comb electrodes 127 causes the tilting ground electrode 127 and the mirrored platform 36, connected thereto, to tilt about the tilt hinges 28. Similarly when a potential is applied to the rolling ground comb electrodes 124 relative to ground layer 126, the electrostatic force of attraction between the hot roll comb electrodes 124 and the rolling ground comb electrodes 130, respectively, causes the mirrored platform 36 and most of the ground layer 126, including the rolling comb ground electrode 130 and the tilting ground comb electrode 127 to tilt (roll) about the roll hinges 32.

Figure 6:
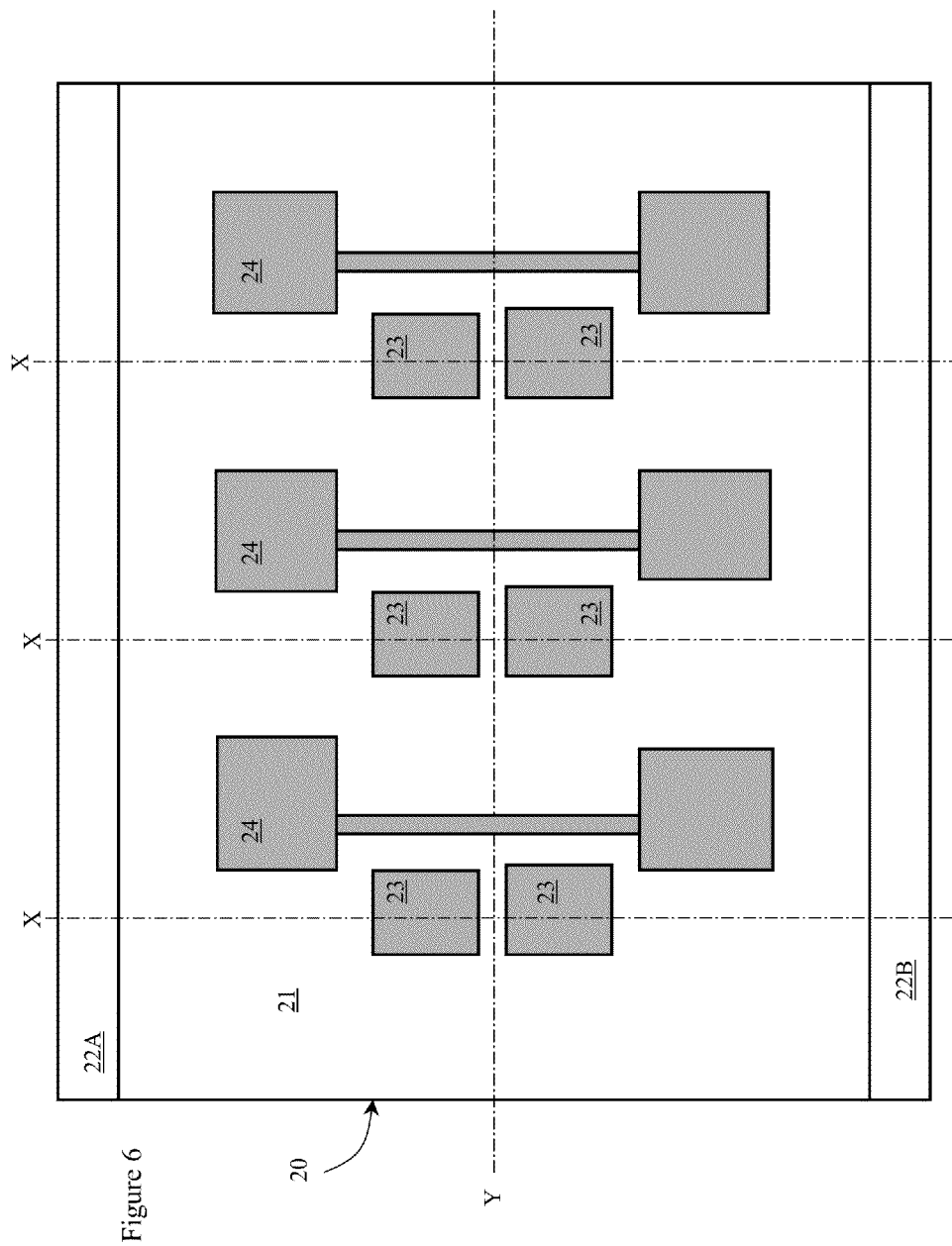
FIG. 6 is a plan view of the hot electrodes of the device of FIG. 5.
Figure 13:
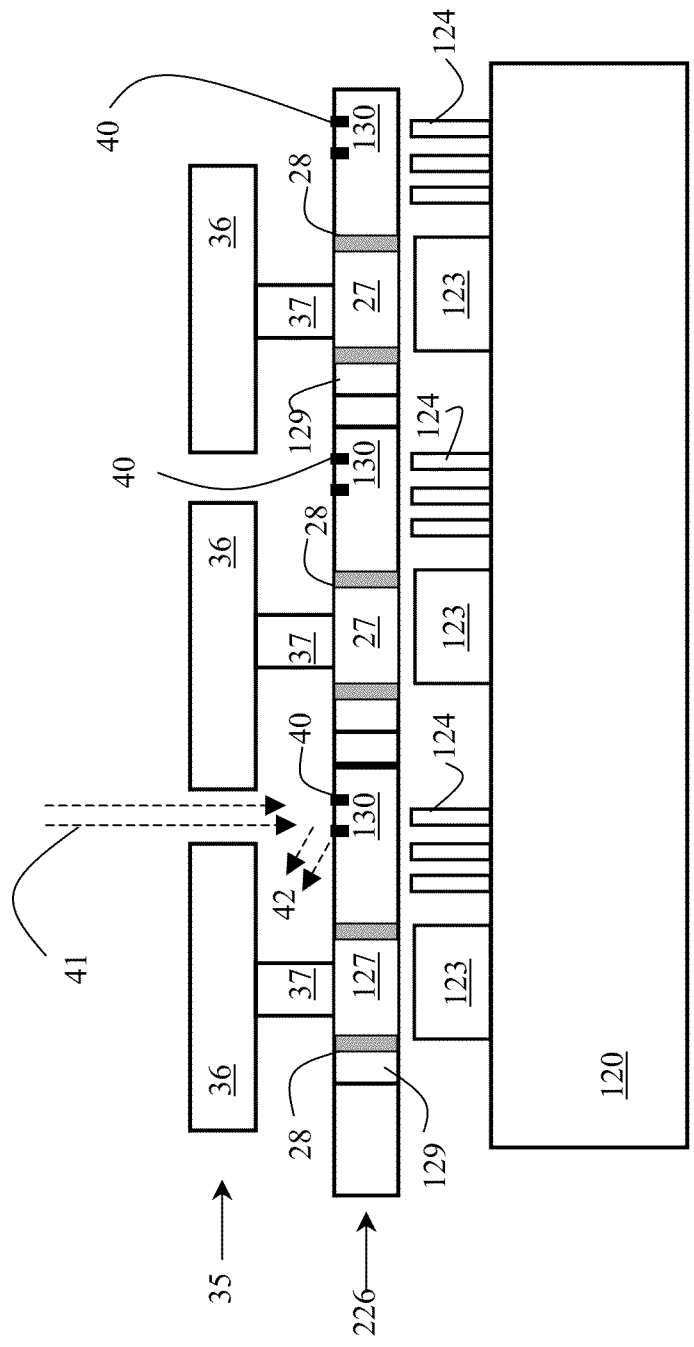
FIG. 13 is a cross-sectional view of a third embodiment of the present invention with an alternative ground electrode structure.
Figure 14:
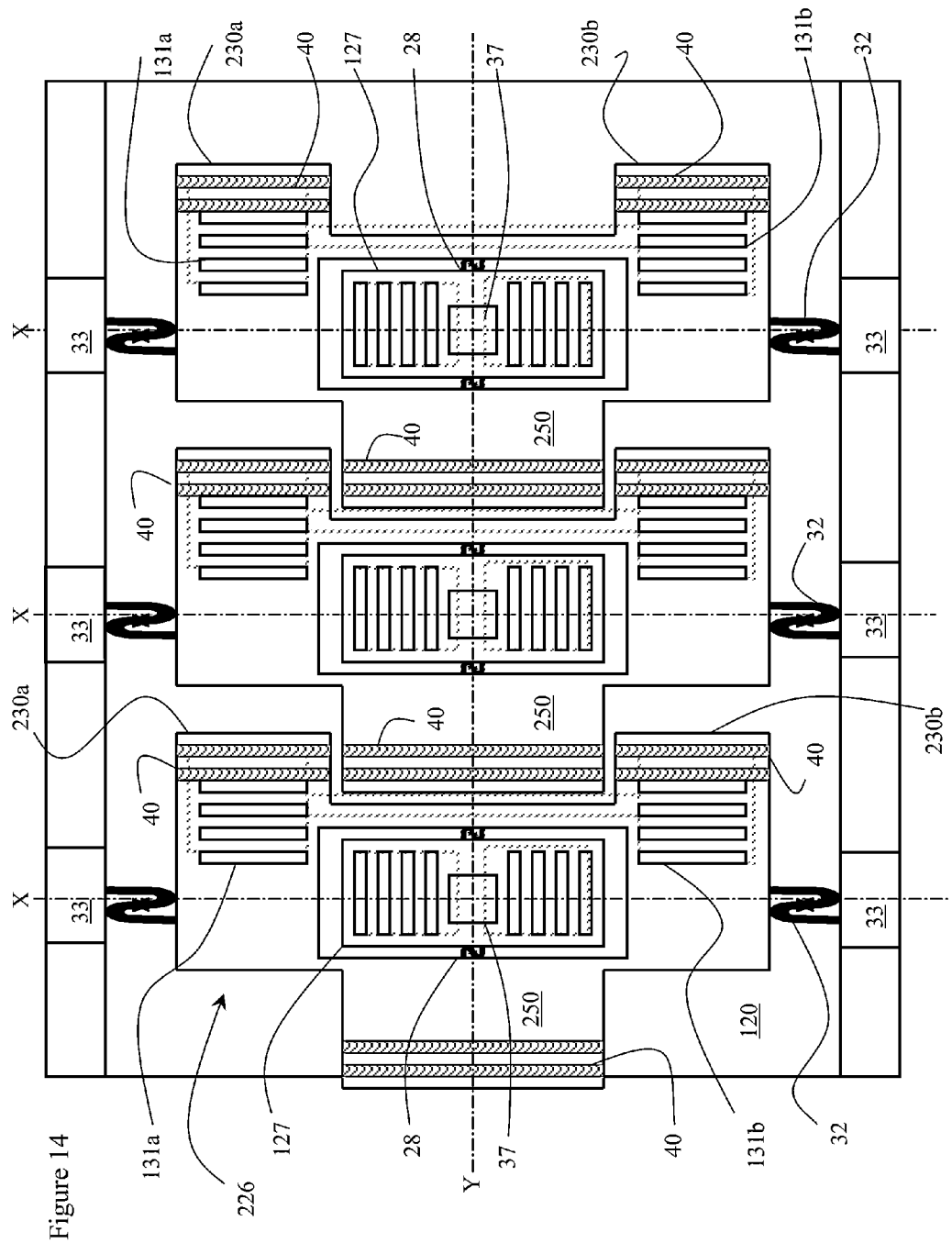
FIG. 14 is a plan view of the alternative ground electrode structure of FIG. 13.
Figure 15:
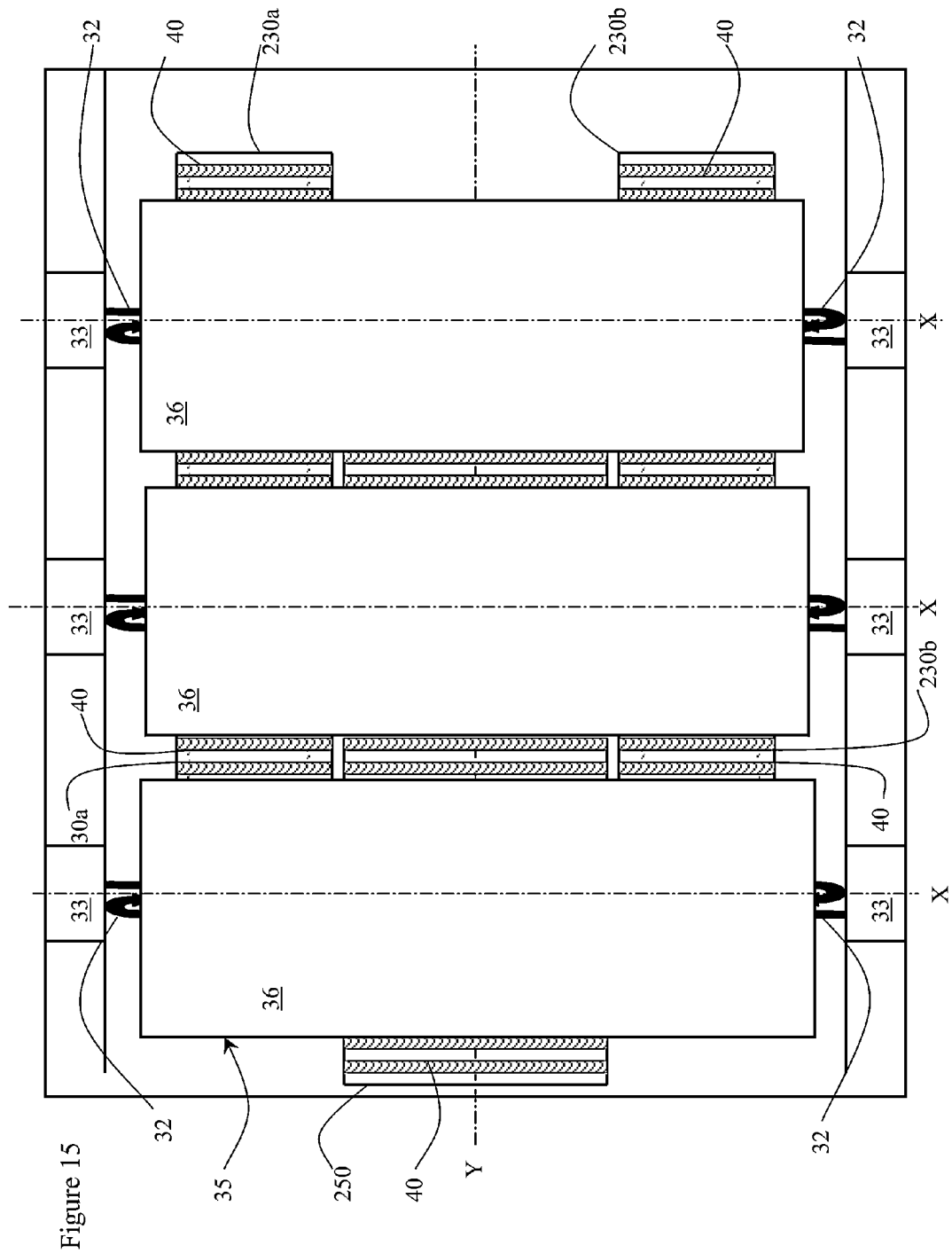
FIG. 15 is a plan view of the entire device of FIG. 13.

With reference to FIGS. 13 to 15, a third embodiment of the present invention includes the same or similar hot electrode structures 23/24 or 123/124 as the previous two embodiments, i.e. FIG. 6 or 11, and the same or similar mirror layer structures 35, 36 and 37, as the previous two embodiments, but with a modified ground electrode layer 226.

The ground electrode/hinge wafer structure 226, processed separately from the hot electrode substrate layer 120, is bonded at each end thereof to mounting platforms 33, which are mounted onto the first and second raised supports 125a to 125d of the substrate wafer 120 suspending the remainder of the ground electrode/hinge wafer 226 above the tilt and roll hot electrodes, e.g. hot stator comb electrodes 123 and 124 illustrated in FIG. 13. The electrode/hinge wafer 226 includes the inner, tilting ground electrode, e.g. tilting ground comb electrode 127. As with the first and second embodiments (FIGS. 7 and 12), the tilting ground comb electrode 127 is pivotable about the lateral Y axis defined by the laterally extending torsional ("piano") tilt hinges 28. The tilt hinges 28 are ideally comprised of two serpentine beams, each with high aspect ratio, e.g. greater than ten, providing relatively low resistance to rotation about the Y-axis, but relatively higher resistance to rotation about the X-axis. The hot tilt comb electrodes 123 are disposed below the tilting ground comb electrodes 127, respectively, i.e. on opposite sides of the tilt hinges 28 and the Y-axis. The tilting ground comb electrode 127 includes two sets of laterally extending cross beams defining rotor comb fingers with slots therebetween offset and interdigitated with the stator comb fingers of the hot tilt comb electrodes 123.

As above, to increase the amount of electrostatic torque the width of the rolling ground wafer 226, in accordance with the present invention is extended, so that the rolling ground wafer 226 spans the air gaps between adjacent mirrored platforms 36, and so that the outer edges of the rolling ground wafer 226 are beneath the adjacent mirrored platforms 36. The rolling ground wafer 226, of the present embodiment, includes first and second rolling ground electrodes 230a and 230b, in the form of rectangular projections at opposite ends of the rolling ground wafer 226, extending in a first direction parallel to the Y axis, so that the outer ends thereof extend across the air gap on a first side of the mirrored platform 36 and the outer edges extend beneath an adjacent mirrored platforms 36 on the first side. The rolling ground wafer also includes a counterbalance section 250 extending in a second direction, opposite the first direction, so that the outer end thereof extends across the air gap on the second, opposite side of the mirrored platform 36 and the outer edge thereof extends beneath the adjacent mirrored platform 36 on the second side. The counterbalance section 250 of one rolling ground wafer 226 fits in the opening between the first and second rolling ground electrodes 230a and 230b of an adjacent rolling ground wafer 226. Ideally, the counterbalance section 250 statically and/or dynamically counterbalances the first and second rolling ground electrodes 230a and 230 about the X axis. Since the counterbalance section 250 and the first and second rolling ground electrodes 230a and 230b are formed in the same rolling ground wafer 226, i.e. have the same thickness, the simplest method to achieve the counterbalancing is to construct the counterbalance section 250 with approximately the same surface area as the first and second rolling ground electrodes 230a and 230b combined. However, there are alternative constructions to achieve the same goal, including additional weights to the underside of the counterbalance section 250.

As in the aforementioned embodiments, diffraction patterns 40 is introduced below the air gaps between the mirrors 36 on the upper surface of the rolling ground electrodes 230a and 230b and on the counterbalance section 250. Diffractive patterns 40 on the upper surfaces of the counterbalance section 250 and the rolling ground electrodes 230a and 230b causes the stray light 41 (FIG. 10) to diffract as beams 42 at such angles that the beams 42 do not return through the gaps between mirrored platforms 36. The diffraction patterns 40 encompasses an area formed by a normal projection, that is a straight-angle projection, of the gap between the mirrored platforms 36 onto the upper surface of the counterbalance section 250 and the rolling ground electrodes 230a and 230b. Any light leaking between the mirrored platforms 36 will be diffracted by the diffractive patterns 40, and therefore, not reflected back into the optical system. In practice, covering about 80% or more of the area of the rolling ground electrodes 230a and 230b and the counterbalance section 250 below the gap is sufficient to effectively suppress the backreflection. As hereinbefore discussed, the diffraction pattern 40 can take various forms including those discussed with reference to FIG. 9.

In the illustrated embodiment, each of the rolling ground electrodes 230a and 230b, includes a set of comb fingers 131a and 131b, respectively, disposed above each of the hot roll comb electrodes 124. Each set of comb fingers 131a and 131b includes longitudinally extending beams defining ground comb fingers with open slots therebetween offset from and interdigitated with the hot comb fingers of the hot roll comb electrodes 124. The longitudinally extending torsional roll hinge 32 extends from each end of the rolling ground comb electrodes 230a and 230b to the mounting platforms 33, which are mounted on the raised supports of the roll and tilt stator comb electrodes 125a, 125b and 125c, 125d. The roll hinges 32 are ideally comprised of serpentine beams, each with high aspect ratios, e.g. greater than 10, providing relatively low resistance to rotation about the X-axis, but relatively higher resistance to rotation about the Y-axis. The tilting ground comb electrode 127 is capable of tilting independently of the rolling ground electrode 226 about the Y-axis; however, the rolling ground comb electrodes 230a and 230b along with the tilting ground comb electrode 127 tilt together about the X-axis via roll hinges 32. The roll hinges 32 also act as electrical connection between ground and external bond pads.

Figure 16:
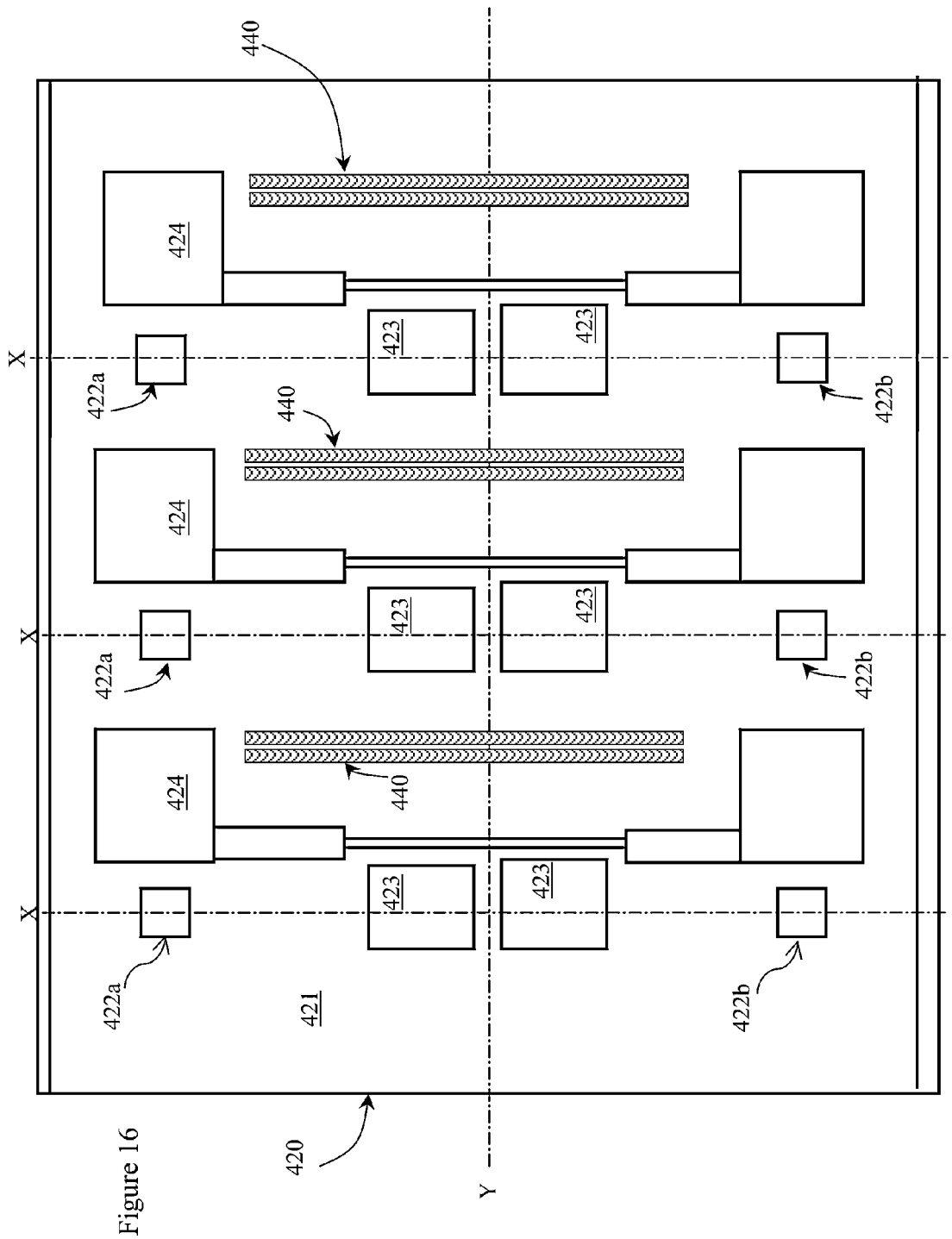
FIG. 16 is a plan view of an alternative hot ground electrode structure of a fourth embodiment of the present invention.
Figure 17:
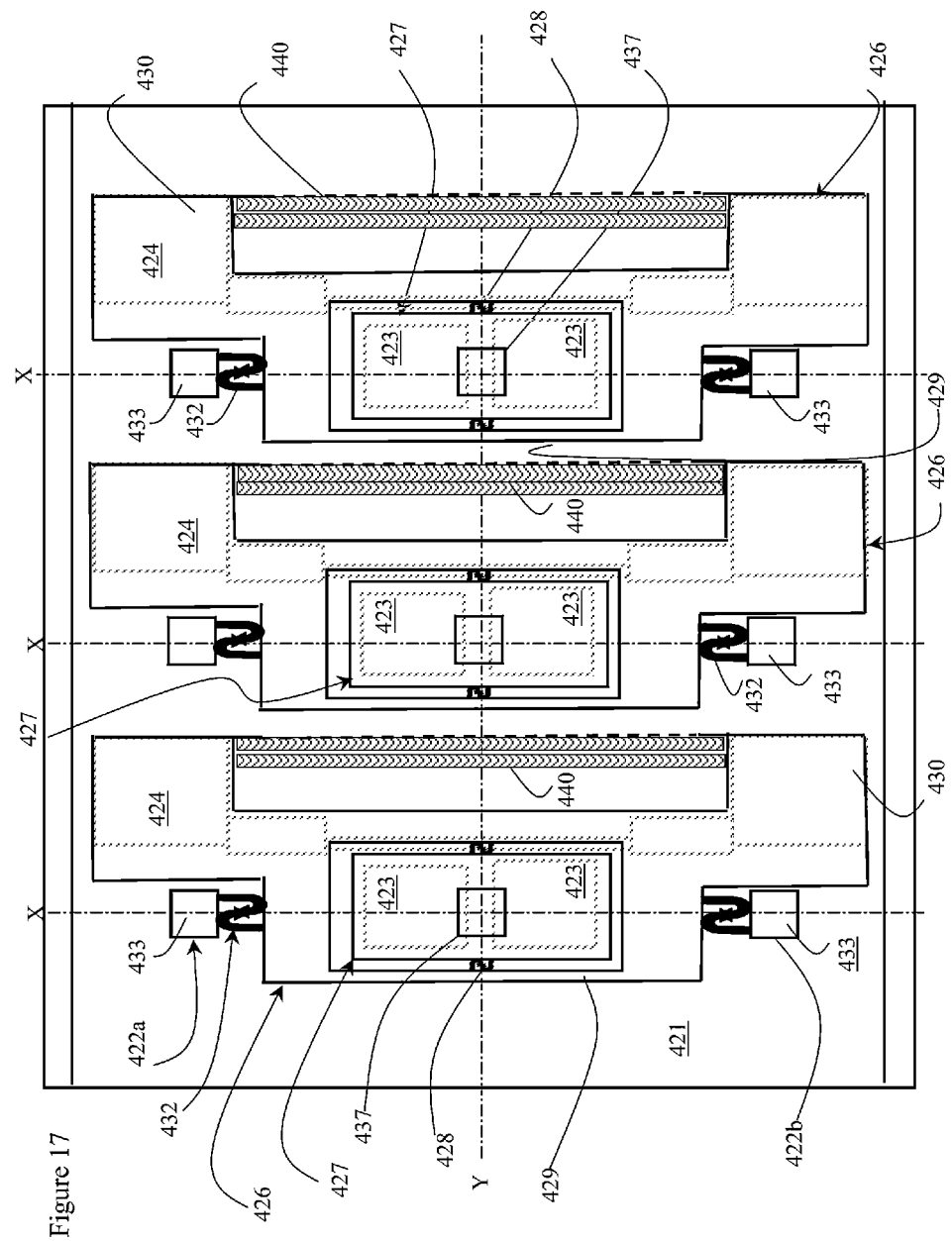
FIG. 17 is a plan view of the alternative ground electrode structure of the embodiment of FIG. 16.
Figure 18:
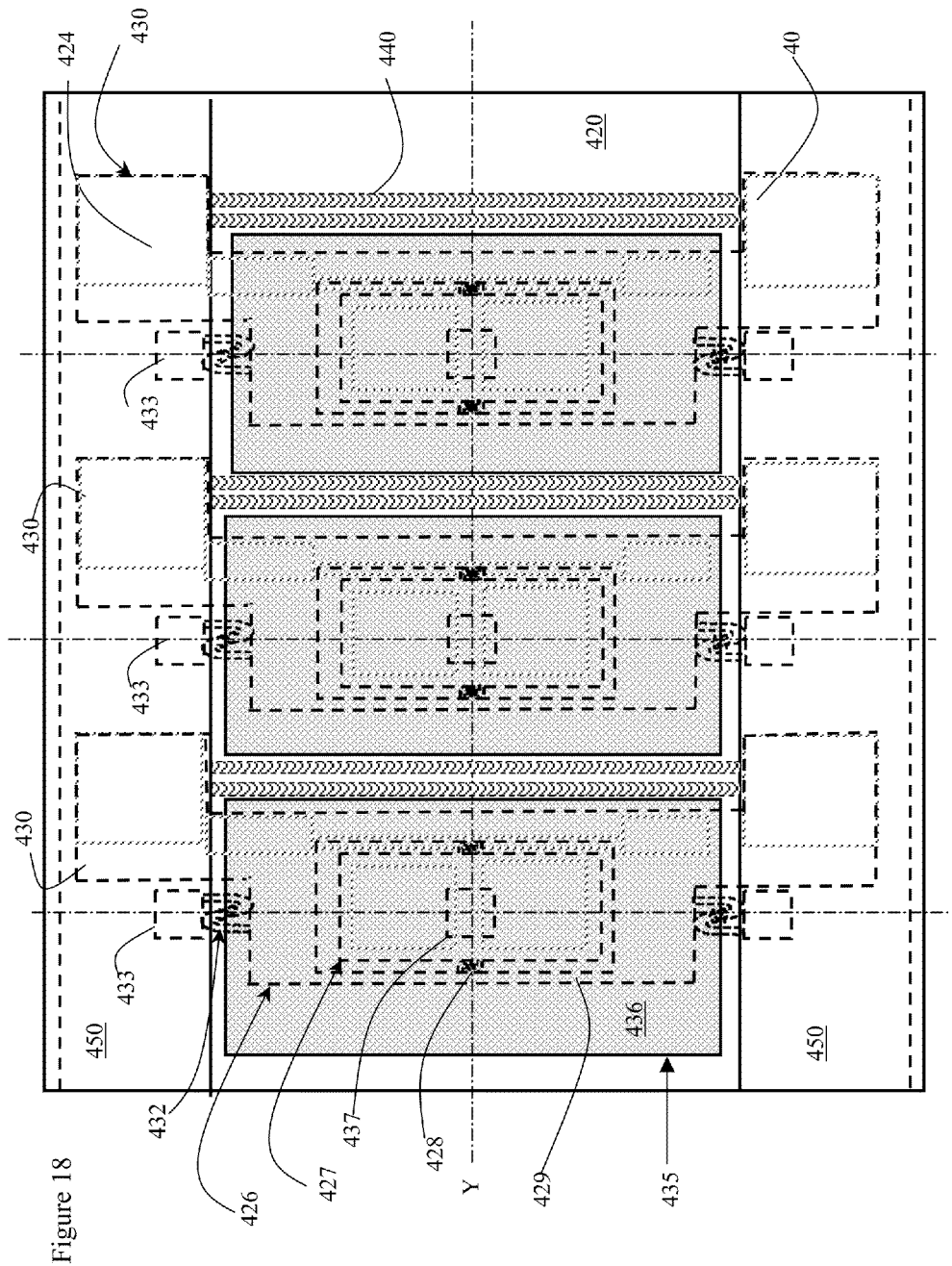
FIG. 18 is a plan view of an alternative mirror structure of the embodiment of FIGS. 16 and 17.

With reference to FIGS. 16 to 18, a fourth embodiment of the MEMS mirror array device of the present invention includes a substrate wafer 420, e.g. glass or silicon, formed with a valley section 421 and raised pedestal supports 422a and 422b at opposite ends thereof. The substrate wafer 420 is patterned with at least one, but preferably two, rectangular-shaped Y (or tilt) hot electro-static electrodes 423 (same as 23 or 123 above), generally along and symmetrical about the longitudinal X-axis of the device and on opposite sides of the lateral Y-axis of the device. An X (or roll) electro-static hot electrode 424 extends along one side of the hot tilt electrodes 423, i.e. on one side of the longitudinal X axis and symmetrical about the lateral Y axis. The hot roll electrode 424 includes two large sections, which are on opposite sides of the hot tilt electrodes 423 and on opposite sides of the Y-axis, with a thinner trace section extending therebetween running along beside the hot tilt electrodes 423. Ideally, each of the large sections of the hot roll electrode 424 extends beyond (along the X axis) the raised end supports 422a or 422b and the ends of the mirrored platform 436 (see FIG. 18). The large sections are connected through the middle by the elongated trace section, which is thinner than the large sections, and which extends beneath the side of rolling ground electrode 426 and the mirrored platform 436 corresponding to the hot roll electrode 424. A crucial aspect in an elongated mirror array is that leverage for the roll torque is limited, hence a large electrode area is required to achieve the desired electrostatic torque. With the hot roll electrode structure shown, the available space for the hot roll electrode in the elongated mirror array is used efficiently and effectively, and achieves the required roll angle for a given voltage. Moreover, the structure of the hot roll and tilt electrodes 423 and 424, respectively, eliminates any undesired tilt induced by the actuation of the hot roll electrode 424. A second hot tilt electrode 423 can be provide on the opposite side of the Y-axis for increasing the control and the range of motion, but use of only a single roll electrode takes up less space, enabling the tilting mirror to remain relatively thin. Positioning the first and second hot tilt electrodes 423 along the X axis enables relatively long and thin mirror structures to be positioned relatively close together with only a small air gap therebetween.

A ground electrode/hinge wafer structure 426, see FIG. 17, processed independent of the substrate wafer 420, is hinged at each end thereof onto the pedestal supports 422a and 422b of the substrate wafer 420, suspending the remaining electrode/hinge structure above the valley section 421 of the substrate wafer 420. The electrode/hinge wafer 426 includes an inner, tilting, rectangular ground element or platform 427 pivotable about the lateral Y axis defined by laterally extending torsional tilt (piano) hinge 428. Each of the hot tilt electrodes 423 is disposed below one side of the tilting ground electrode platform 427, i.e. one on each side of the Y-axis, for attracting the bottom of one side of the tilting ground electrode 427.

The tilt hinge 428 is ideally comprised of first and second serpentine beams extending from opposite sides of the tilting ground electrode 427, each with high aspect ratios, e.g. greater than ten, providing relatively low resistance to rotation about the Y-axis, but relatively higher resistance to rotation about the X-axis, although other hinge configurations, as is known in the prior art, are within the scope of the invention. The outer end of the first serpentine beam is fixed to a cross brace 429 proximate the lateral Y axis, while the outer end of the second serpentine beam is fixed to a rolling ground electrode 430 disposed above the hot roll electrode 424. The rolling ground electrode 430, like the hot roll electrode 424, extends longitudinally beyond the pedestal support 422a and 422b, and longitudinally beyond the ends of the mirror 436. The rolling ground electrode 430 also extends laterally beyond the edge of the corresponding mirrored platform 436, and outwardly at least the distance of the gap between adjacent mirrored platforms 436. Full length rolling ground electrodes 430 would extend laterally to beneath adjacent mirrored platforms 436; however, split rolling ground electrodes 430, as illustrated in FIG. 17, extend laterally the distance of the gap between adjacent mirrored platforms 436 to beyond the edges thereof, but do not literally extend to beneath an adjacent mirrored platform 436.

Generally longitudinally extending torsional roll hinges 432 extend from the electrode/hinge wafer 426 to mounting platforms 433, which are mounted on the raised pedestal sections 422a and 422b of the substrate 420. The roll hinges 432 are ideally comprised of serpentine beams, each with high aspect ratios, e.g. greater than ten, providing relatively low resistance to rotation about the X-axis, but relatively higher resistance to rotation about the Y-axis; however, other hinge configurations are within the scope of the invention. The tilting ground electrode 427 is capable of tilting independently from the rolling ground electrode 430 about the Y-axis, because the tilt hinge 428 extends from the rolling ground electrode 430 and does not resist rotation about the Y-axis, enabling the tilting ground electrode 427 to rotate about the Y-axis while the rolling ground electrode 430 remains still. The entire rolling ground electrode 430 along with the tilting ground electrode 427 tilt (roll) together about the X-axis via the roll hinge 432, because the tilt hinge 428 resists rotation of the tilting ground electrode 427 about the X-axis relative to the rolling ground electrode 430. The roll hinges 432 also acts as an electrical connection between ground and external bond pads.

A mirror wafer 435 is patterned separately from the ground electrode/hinge wafer 426 and the substrate wafer 420 with an upper reflective body or platform 436 and a pedestal 437 extending downwardly therefrom, which in turn is bonded onto the tilting ground electrode 427. The mirror wafer 435, see FIG. 18, may have stiffening features, such as ribs or bulkheads extending between the pedestal 437 and the mirrored platform 436, if required. The mirror wafer 435 of the present embodiment, also includes a fixed membrane or overhang section 450, which can be formed in the same step as the mirror platform 436, and then subsequently separated therefrom. The overhang section 450 ideally covers the raised pedestals 422a and 422b, as well as from 50% to 100% of the tilting hot and ground electrodes 424 and 430, respectively. While only three MEMS devices are illustrated in the attached figures, ideally in practice, any number of the MEMS devices forming a side-by-side array are positioned adjacent each other with a common tilt axis (Y-axis) parallel roll axes (X-axis), and with only a small air gap between mirrored platforms 36 for redirecting individual sub-beams from a dispersed beam of light, as disclosed in U.S. Pat. No. 6,934,439 issued Aug. 23, 2005 in the name of Mala et al of JDS Uniphase Inc, which is incorporated herein by reference.

As the pitch of mirror arrays decreases to less than 100 um the size of the rolling ground and rolling hot electrodes in a conventional mirror array becomes too small to generate enough electrostatic torque to roll each mirror platform 436 effectively. To increase the amount of electrostatic torque, the lateral and longitudinal dimensions (width and length) of the rolling ground electrode 430 in accordance with the present embodiment are extended beyond the roll hinges 432, the raised pedestals 422a and 422b, and the ends of the mirror 435 to beneath the overhang section 450, and laterally beyond the side edges of the mirror platform 436, so that the rolling ground electrode 430 spans the distance between adjacent mirror platforms 436, and so that the outer edges of the rolling ground electrode 430 is beneath the adjacent mirrored platform 436. In a possible embodiment (shown in broken outline in FIG. 17), the rolling ground electrode 430 extends the entire length of the mirror platform 436 for filling the entire air gap between adjacent mirror platforms 436; however, in a preferred embodiment, the section of the electrode/hinge wafer 426 between the two large sections is removed leaving an open section therebetween. In the latter embodiment the rolling ground electrode is effectively provided in the two larger sections thereof, which extend and are ideally completed covered and housed beneath the overhang section 450, thereby eliminating any possible interaction between the electrode/hinge wafers 426 of adjacent mirror devices, since the large active sections of both the hot and ground roll electrodes 424 and 430 are beneath the overhang section 450 and not beneath the mirror platform 436.

The rolling ground and hot electrodes 424 and 430 can be replaced with vertical comb fingers, similar to vertical comb fingers 124, and comb fingers, similar to comb fingers 131a and 131b, as hereinbefore discussed with reference to FIGS. 13 and 14. Furthermore the tilting hot and ground electrodes 423 and 427 can be replaced by vertical comb fingers, similar to vertical comb fingers 123 and 127, as hereinbefore discussed.

Another problem solved by a preferred embodiment of the present invention is the problem of stray light from an optical system reaching MEMS substrate 420 through the gaps between the MEMS mirror platforms 436 and being reflected back into the system from the MEMS substrate 420 through the gaps resulting in undesirable back reflection. The back-reflected light degrades optical performance of the optical system.

To solve the problem, according to the present invention, a diffraction pattern 440 is introduced below the air gaps between the mirrors 435 on the upper surface of the rolling ground electrode 430 or on the substrate 420. A diffractive pattern 440 causes the stray light 41 (FIG. 5) to diffract as beams 42 at such angles that the beams 42 do not return through the gaps between mirrored platforms 436. The diffraction pattern 440 encompasses an area formed by a normal projection, that is a straight-angle projection, of the gap between the mirror platforms 436 onto the upper surface of the rolling ground electrode 430 or the substrate 420. Any light leaking between the mirror platforms 436 will be diffracted by the diffractive pattern 440, and therefore, not reflected back into the optical system. In practice, covering about 80% or more of the area of the gap is sufficient to effectively suppress the backreflection.

The diffractive pattern 440 is shown in FIG. 9 as etched into the top surface, forming a surface-relief diffraction grating defined herein as a diffractive pattern having straight lines. Other types of diffractive patterns, and not necessarily surface-relief patterns but, for example, patterned oxide overlayers, with straight or curved lines, diamond patterns, or honeycomb patterns, will also work with present invention.

We claim:

1. An array of micro-electro-mechanical (MEMS) devices mounted on a substrate, each MEMS device comprising:
    a substrate including first and second supports extending therefrom;
    a tilt ground electrode pivotable about a first axis;
    first hinges, defining the first axis, extending from opposite sides of the tilt ground electrode;
    a roll ground electrode structure, surrounding the tilt ground electrode and receiving the ends of the first hinges, and pivotable about a second axis perpendicular to the first axis;
    second hinges, defining the second axis, extending from opposite ends of the roll ground electrode structure, the outer ends of which are fixed to the first and second supports;
    a pedestal extending upwardly from the tilt ground electrode;
    a reflective body mounted on the pedestal, spaced apart from the tilt ground electrode by the pedestal, and having opposite ends along the second axis and opposite sides along the first axis;
    a first hot electrode mounted on the substrate along the second axis for rotating the tilt ground electrode and the reflective body about the first axis; and
    a second hot electrode mounted on the substrate on one side of the second axis for rotating the roll ground electrode structure, the tilt ground electrode, and the reflective body about the second axis;
    wherein the MEMS devices are aligned with the second axes parallel to each other with an air gap between each reflective body; and
    wherein each of the roll ground electrode structures extends farther from the second axis towards an adjacent MEMS device than the reflective body to provide sufficient torque to roll the reflective body about the second axis.

2. The array of MEMS devices according to claim 1, wherein each roll ground structure extends laterally a distance larger than the gap between the reflective bodies of adjacent MEMS devices.

3. The array of MEMS devices according to claim 1, wherein each roll ground structure extends laterally to beneath an adjacent reflective body.

4. The array of MEMS devices according to claim 3, wherein each roll ground structure extends longitudinally, substantially the length of the corresponding reflective body, for filling the air gap between adjacent reflective bodies.

5. The array of MEMS devices according to claim 4, further comprising diffractive patterns on each of the roll ground electrode structures for preventing light passing through the air gap between adjacent reflective bodies from being reflected back through the air gap.

6. The array of MEMS devices according to claim 1, wherein the roll ground electrode structure includes:
    a first roll ground electrode section extending outwardly from a first end of the roll ground electrode structure on one side of the second axis;

a second roll ground electrode section extending outwardly from a second end of the roll ground electrode structure on the one side of the second axis, with an opening between the first and second roll ground electrode sections.

7. The array of MEMS devices according to claim 6, wherein the second hot electrode includes a first section beneath the first roll ground electrode section, a second section beneath the second roll ground electrode section, and a trace section extending therebetween.

8. The array of MEMS devices according to claim 6, wherein the first and second roll ground electrode sections extend across the air gap to beneath an adjacent reflective body.

9. The array of MEMS devices according to claim 8, further comprising diffractive patterns on the first and second roll ground electrode sections for preventing light, passing through the air gap between adjacent reflective bodies, from being reflected back through the air gap.

10. The array of MEMS devices according to claim 6, further comprising:
    a counter balance structure extending outwardly from the roll ground electrode structure on an opposite side of the second axis for counterbalancing the first and second roll ground electrode sections about the second axis.

11. The array of MEMS devices according to claim 10, wherein the counter balance structure extends across the air gap to beneath an adjacent reflective body.

12. The array of MEMS devices according to claim 11, wherein the counter balance structure extends into the opening between the first and second rolling ground electrode sections of an adjacent MEMS device.

13. The array of MEMS devices according to claim 11, further comprising diffractive patterns on the counter balance structure for preventing light passing through the air gap between adjacent reflective bodies from being reflected back.

14. The array of MEMS devices according to claim 7, wherein the first and second roll ground electrode sections extend longitudinally beyond the ends of the reflective body.

15. The array of MEMS devices according to claim 14, wherein the first and second roll ground electrode sections extend longitudinally beyond the first and second supports, respectively.

16. The array of MEMS devices according to claim 15, further comprising a first overhang adjacent one end of the reflective body for covering the first roll and ground electrode sections; and a second overhang adjacent the other end of the reflective body for covering the second roll and ground electrode sections.

17. The array of MEMS devices according to claim 1, wherein the first hot electrode includes a first set of comb fingers extending laterally parallel to the first axis; and wherein the tilt ground electrode includes laterally extending beams offset with the set of comb fingers in the first hot electrode.

18. The array of MEMs devices according to claim 17, wherein the first set of comb fingers of the first hot electrode are symmetrical about the second axis.

19. The array of MEMs devices according to claim 17, wherein the second hot electrode includes second and third sets of comb fingers extending longitudinally parallel to the second axis; and wherein the roll ground electrode includes longitudinally extending beams offset with the comb fingers in the second and third sets of comb fingers.

20. The array of MEMs devices according to claim 1, wherein the tilt hinges comprise serpentine torsional hinges with an aspect ratio greater than ten, enabling rotation of the tilt ground electrode about the first axis and resisting rotation of the tilt ground electrode about the second axis; and wherein the roll hinges comprise serpentine torsional hinges with an aspect ratio greater than ten, enabling rotation of the roll ground electrode about the second axis and resisting rotation of the roll ground electrode about the first axis.

* * * * *